United States Patent
Heinonen et al.

(10) Patent No.: US 6,744,753 B2
(45) Date of Patent: Jun. 1, 2004

(54) LOCAL SERVICE HANDOVER

(75) Inventors: Tomi Heinonen, Tampere (FI); Timo M. Laitinen, Tampere (FI); Jarkko Lempiö, Nokia (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/985,193

(22) Filed: Nov. 1, 2001

(65) Prior Publication Data

US 2003/0112789 A1 Jun. 19, 2003

(51) Int. Cl.$^7$ ................................................. H04Q 7/24
(52) U.S. Cl. ....................................... 370/338; 370/401
(58) Field of Search ................................ 370/328, 331, 370/338, 352, 353, 354, 355, 356, 389, 392, 395.1, 465, 478, 498; 455/3.01, 41, 554, 555, 422, 426, 41.2, 422.1, 426.1, 426.2, 554.1, 554.2, 436, 444

(56) References Cited

U.S. PATENT DOCUMENTS

| | | | |
|---|---|---|---|
| 5,987,099 A | | 11/1999 | O'Neill et al. |
| 6,138,159 A | * | 10/2000 | Phaal .......................... 709/226 |
| 6,167,278 A | | 12/2000 | Nilssen |
| 6,243,581 B1 | * | 6/2001 | Jawanda ...................... 455/432 |
| 6,285,879 B1 | * | 9/2001 | Lechner et al. .............. 455/432 |
| 6,317,781 B1 | | 11/2001 | De Boor et al. |
| 6,330,448 B1 | * | 12/2001 | Otsuka et al. ............... 455/436 |
| 6,414,955 B1 | | 7/2002 | Clare et al. |
| 6,421,707 B1 | | 7/2002 | Miller et al. |
| 6,430,395 B2 | * | 8/2002 | Arazi et al. .................... 455/41 |
| 6,430,413 B1 | * | 8/2002 | Wedi et al. .................. 455/442 |
| 6,445,921 B1 | * | 9/2002 | Bell ............................. 455/426 |
| 6,477,373 B1 | * | 11/2002 | Rappaport et al. .......... 455/436 |
| 6,519,453 B1 | * | 2/2003 | Hamada et al. .............. 455/432 |
| 2002/0015042 A1 | | 2/2002 | Robatham et al. ........... 345/581 |
| 2002/0094778 A1 | | 7/2002 | Cannon et al. ................ 455/41 |
| 2002/0193073 A1 | | 12/2002 | Fujioka ......................... 455/41 |
| 2003/0036350 A1 | | 2/2003 | Jonsson et al. ................ 455/41 |
| 2003/0115038 A1 | | 6/2003 | Want et al. .................... 703/24 |
| 2003/0119446 A1 | | 6/2003 | Fano et al. .................... 455/41 |
| 2003/0119494 A1 | | 6/2003 | Alanara et al. ............. 455/421 |
| 2003/0177113 A1 | | 9/2003 | Wakita ........................... 707/3 |
| 2003/0208595 A1 | | 11/2003 | Gouge et al. ................ 709/225 |

FOREIGN PATENT DOCUMENTS

| | | | | |
|---|---|---|---|---|
| AU | 200135071 A | * | 10/2001 | ........... H04L/29/08 |
| EP | 0 944 176 | | 9/1999 | |
| WO | WO 02/03626 A2 | * | 1/2002 | ........... H04L/12/56 |

OTHER PUBLICATIONS

U.S. patent application Ser. No. 09/854,635, Kaita et al., filed May 15, 2001.
U.S. patent application Ser. No. 09/950,773, Kaita et al., filed Sep. 13, 2001.

(List continued on next page.)

*Primary Examiner*—Chi Pham
*Assistant Examiner*—Keith M. George
(74) *Attorney, Agent, or Firm*—Morgan & Finnegan, LLP; Joseph C. Redmond, Jr.

(57) ABSTRACT

When a mobile wireless device is within the coverage area of a short range wireless access point, it sends a request for service to be obtained over the Internet from a network server. The short range wireless access point receives a response message over the Internet from the server, including a global/local parameter to notify the mobile wireless device whether the requested service is available outside the coverage area of the short range wireless access point. The access point forwards the response message to the mobile wireless device, which uses the information in the message to contact the server over the Internet. If the mobile wireless device detects that it has left the coverage area of the short range wireless access point while in contact with the server, it will determine whether the global/local parameter indicates that the service is global. If the parameter is global, then the mobile wireless device accesses a stored handover address.

81 Claims, 19 Drawing Sheets

OTHER PUBLICATIONS

U.S. patent application Ser. No. 10/101,688, Aholainen et al., filed Mar. 21, 2002.

U.S. patent application Ser. No. 10/073,200, Hamberg, Feb. 13, 2002.

International Search Report (Apr. 21, 2003).

Customized Messaging Between Wireless Access Point and Services, Nov. 1, 2001, Heinonen et al.

Service Notification on a Low Bluetooth Layer, Nov. 1, 2001, Heinonen et al.

* cited by examiner

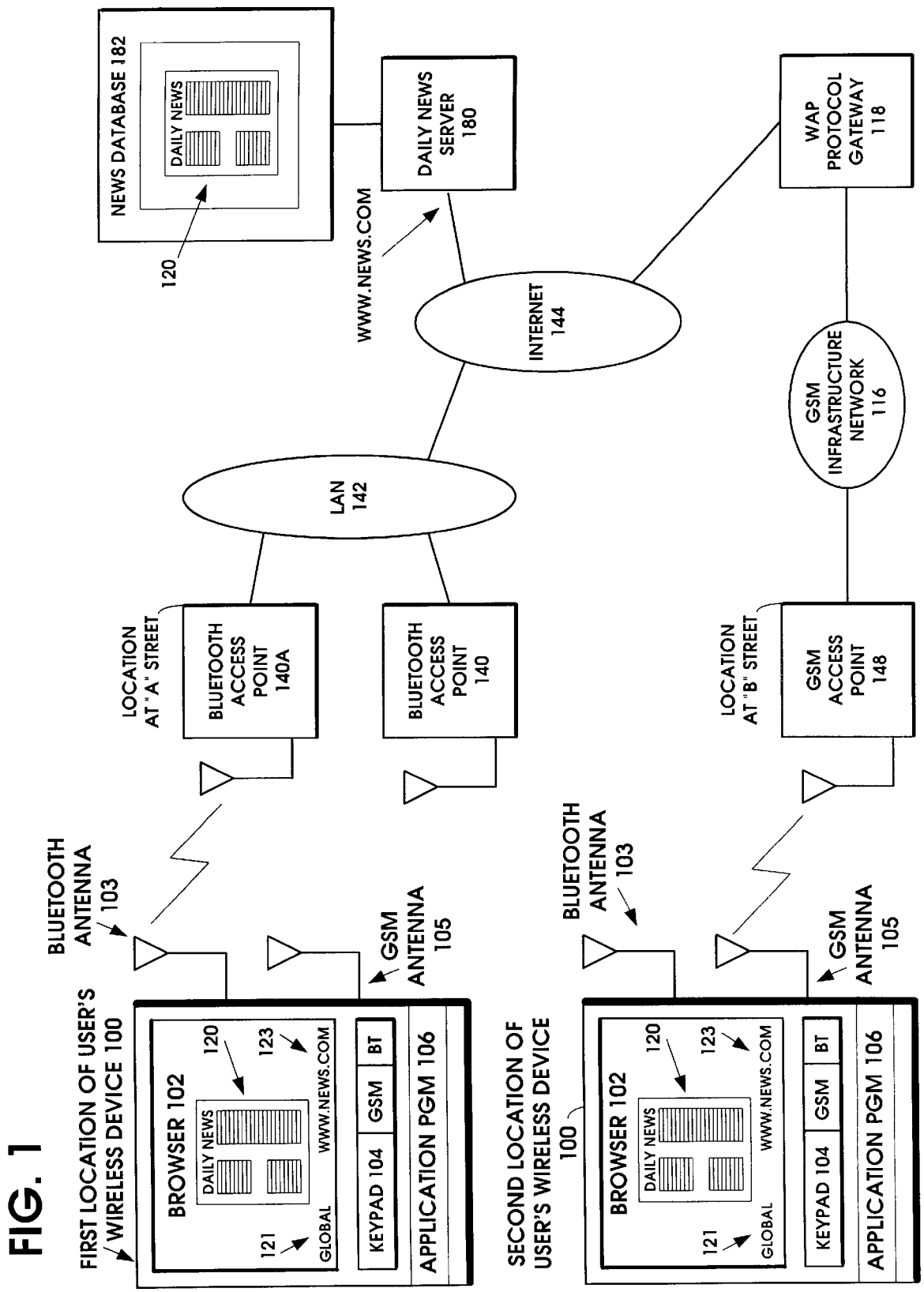

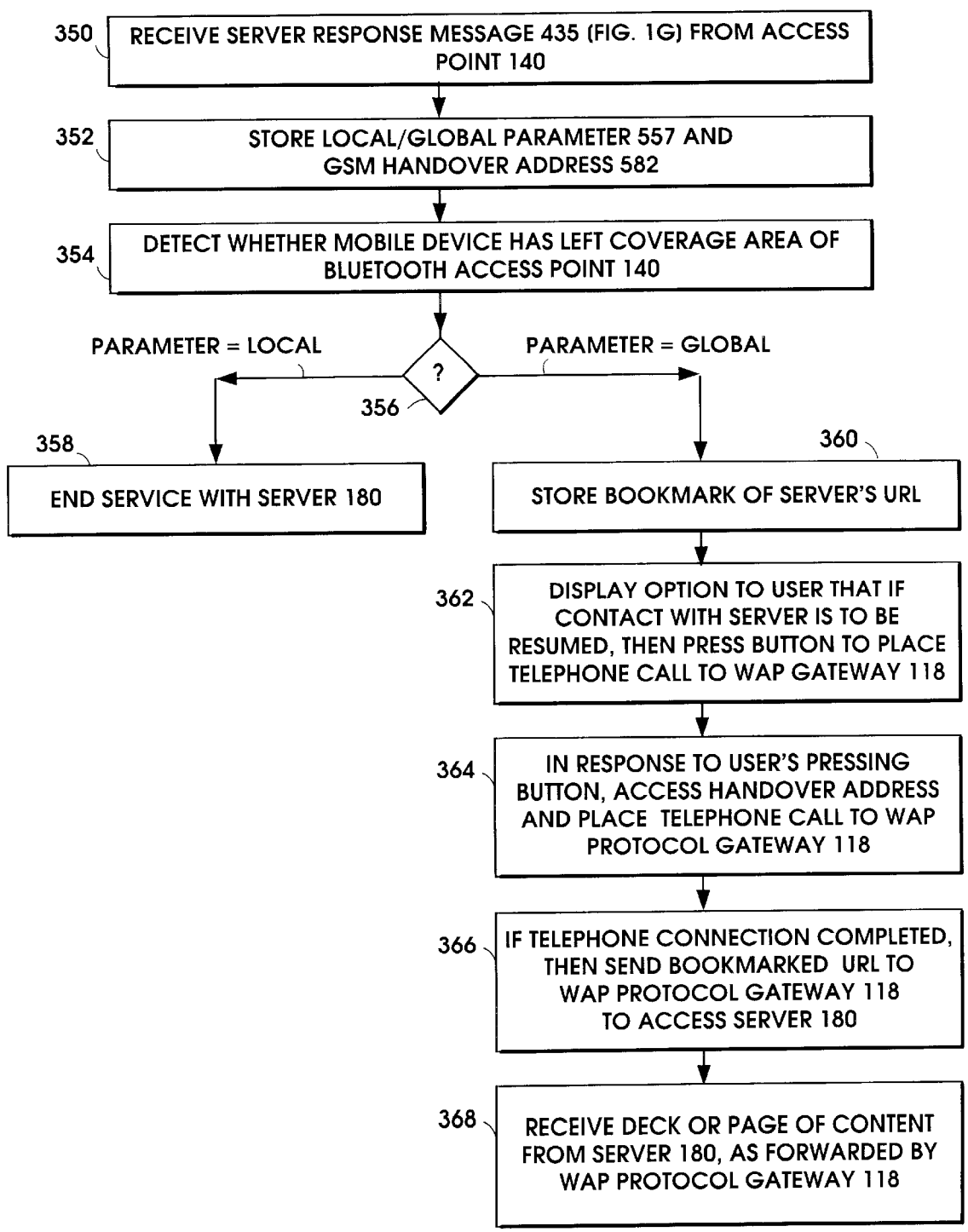
FIG. 1B PROCESSING IN USER'S MOBILE DEVICE 100

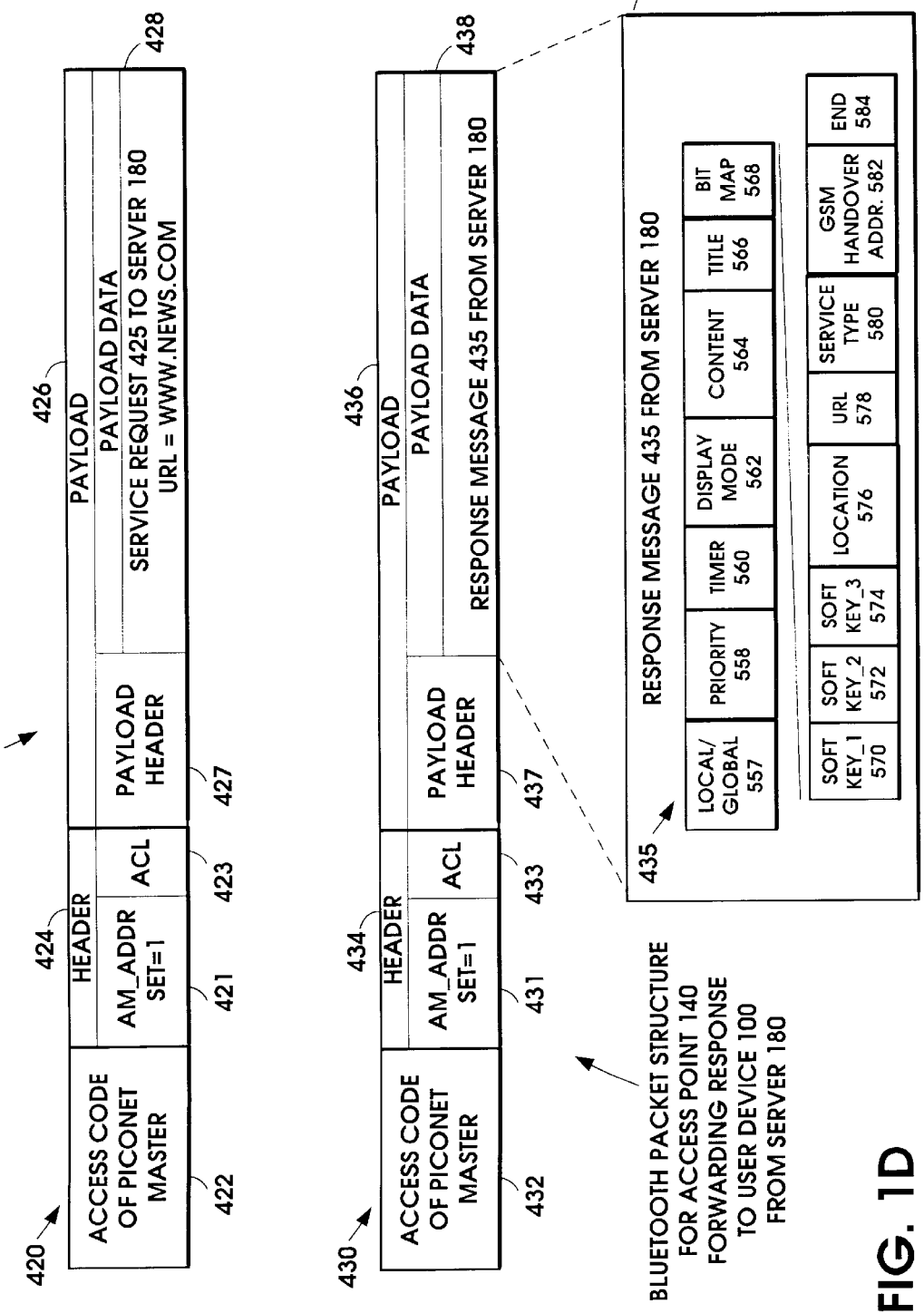

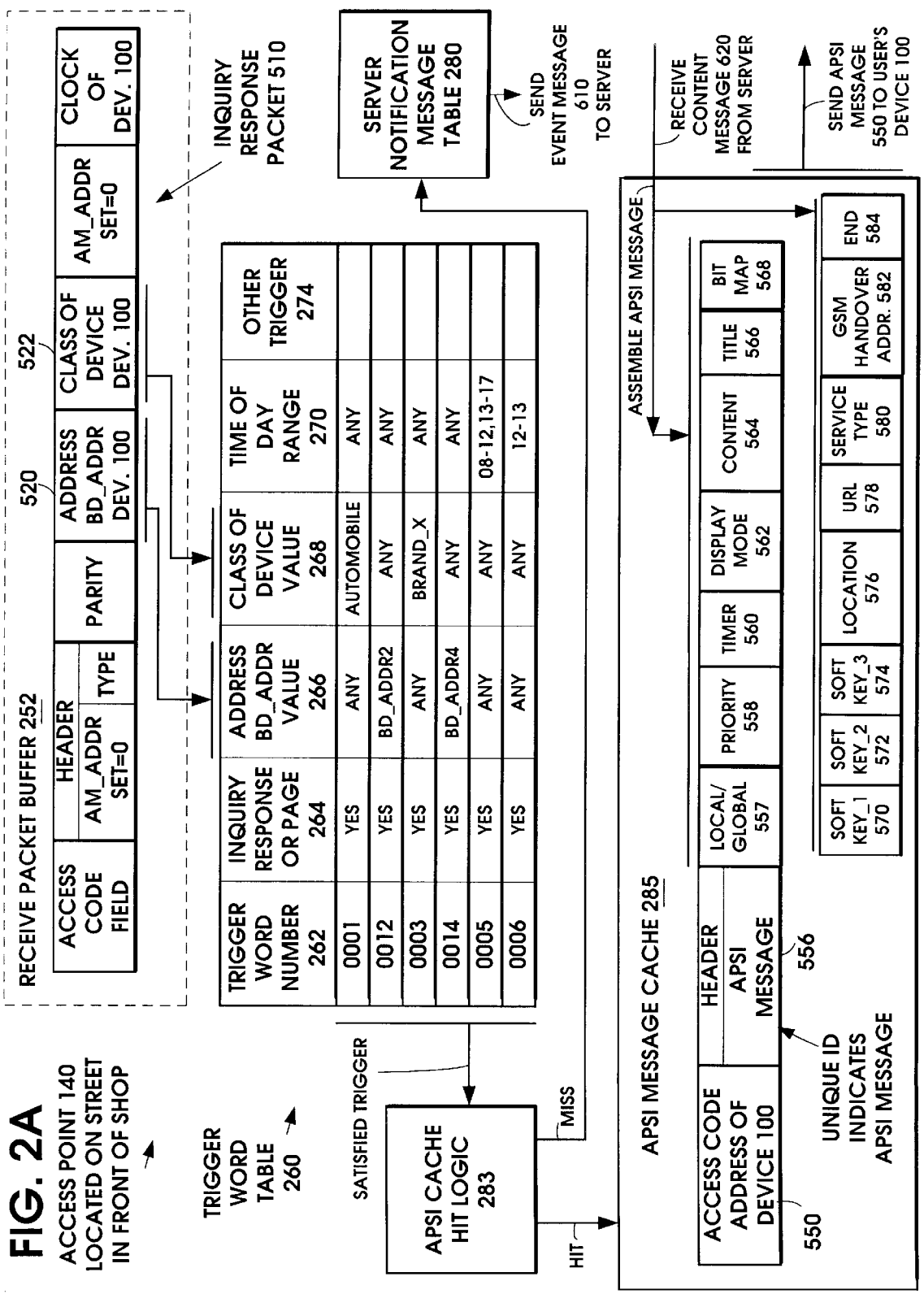

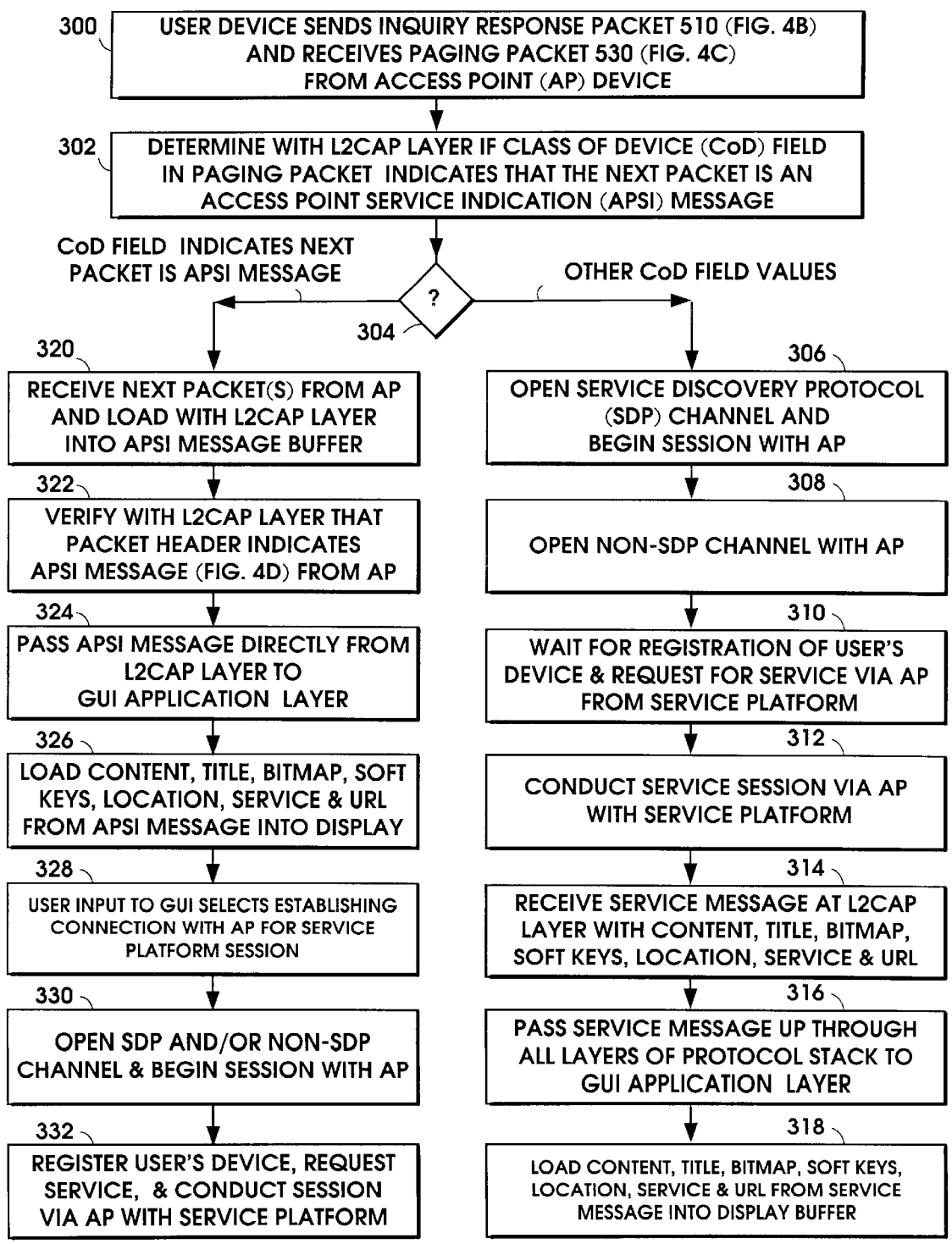

FIG. 3A

PROCESSING ACCESS POINT SERVICE INDICATOR MESSAGE IN CLIENT DEVICE 100

400 — USER DEVICE 100 SENDS INQUIRY RESPONSE PACKET 510 (FIG. 4B) AND RECEIVES THE PAGING PACKET 530 (FIG. 4C) FROM THE ACCESS POINT (AP) DEVICE 140.

402 — USER DEVICE 100 RECEIVES THE NEXT PACKET(S) FROM THE AP, AND THE L2CAP LAYER 220 DETERMINES THAT PACKET HEADER 554 INDICATES AN APSI MESSAGE 550 FROM THE AP 140 AND THE L2CAP LAYER 220 LOADS IT INTO AN APSI MESSAGE BUFFER 236.

404 — THEN, THE L2CAP LAYER 220 PASSES THE APSI MESSAGE 550 DIRECTLY TO THE GUI APPLICATION LAYER 234. THE APSI MESSAGE 550 CONTAINS FIELDS FOR CONTENT, TITLE, BITMAP, SOFT KEY SELECTION ITEMS, LOCATION INFORMATION, SERVICE TYPE INFORMATION AND URL.

406 — THE GUI LAYER 234 THEN LOADS THE CONTENT, TITLE, BITMAP, SOFT KEY SELECTION ITEMS, LOCATION INFORMATION, SERVICE TYPE INFORMATION AND URL FROM THE APSI MESSAGE 550 INTO THE DISPLAY BUFFER 244.

408 — THEN, THE USER SELECTIVELY ENTERS AN INPUT TO THE GUI 234 TO ESTABLISH A CONNECTION WITH THE AP 140 FOR A SESSION WITH THE SERVICE PLATFORM SERVER 180.

410 — THE USER DEVICE 100 AND THE AP 140 THEN OPEN AN SDP AND/OR A NON-SDP CHANNEL AND THEY BEGIN A SESSION.

412 — THE AP 140 REGISTERS THE USER'S DEVICE 100 WITH THE SERVICE PLATFORM SERVER 180 AND REQUESTS SERVICE FOR THE USER'S DEVICE 100. THEN, THE USER'S DEVICE 100 AND THE SERVICE PLATFORM SERVER 180 CONDUCT A SESSION VIA THE AP 140. THE SERVICE PLATFORM SERVER 180 CAN THEN DOWNLOAD THE CONTENT, ADVERTISING AND/OR OTHER SERVICE OFFERINGS TO THE MOBILE BLUETOOTH DEVICE 100.

FIG. 4A BLUETOOTH PACKET STRUCTURE FOR AN INQUIRY PACKET SENT BY ACCESS POINT DEVICE TO USER'S DEVICE 100
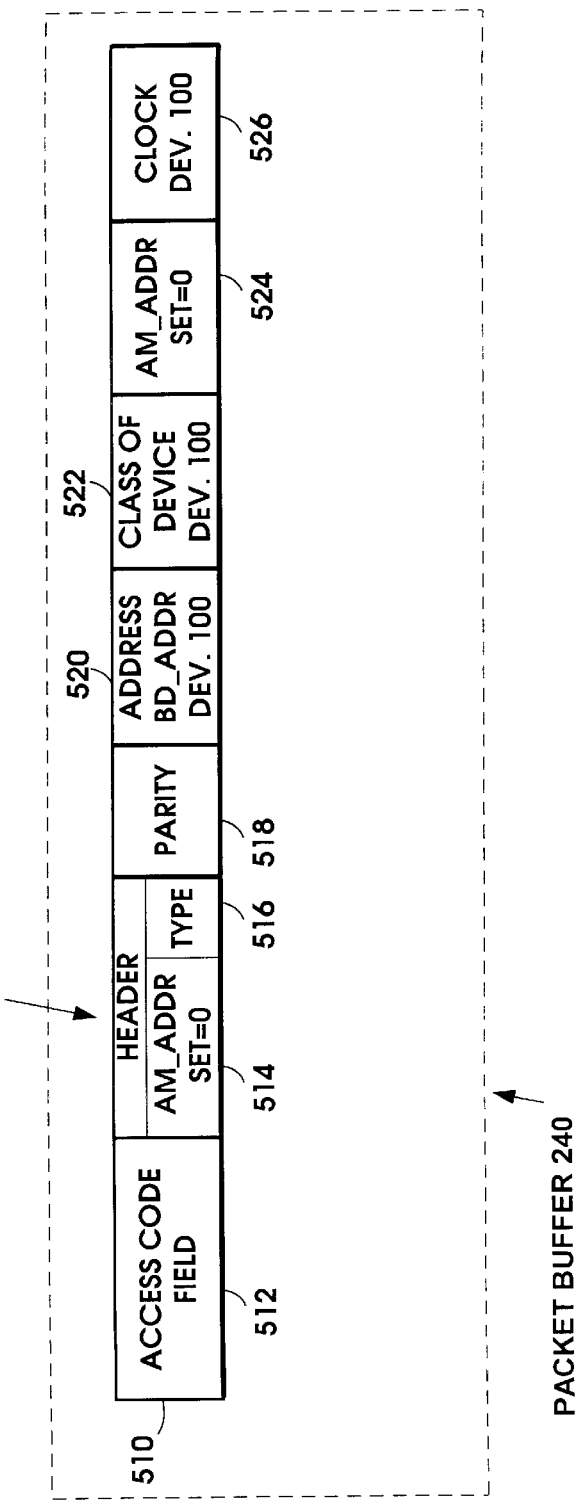
FIG. 4B BLUETOOTH FHS PACKET STRUCTURE FOR AN INQUIRY RESPONSE PACKET SENT BY USER'S DEVICE 100

LOCAL SERVICE HANDOVER

FIELD OF THE INVENTION

The invention disclosed broadly relates to ubiquitous computing and more particularly relates to improvements in short range wireless technology.

BACKGROUND OF THE INVENTION

Short Range Wireless Systems

Short range wireless systems have a typical range of one hundred meters or less. They often combine with systems wired to the Internet to provide communication over long distances. The category of short range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HiperLAN Standard, which operates in the 5 GHz U-NII band.

The Bluetooth Short Range Wireless Technology

Bluetooth is a short range radio network, originally intended as a cable replacement. It can be used to create networks of up to eight devices operating together. The Bluetooth Special Interest Group, Specification Of The Bluetooth System, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten meter radio communications range and to discover what services they offer, using a service discovery protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. This process is relatively fast, typically being completed in approximately from one to five seconds. Then the Logical Link Control and Adaptation Protocol (L2CAP) layer in the transport protocol group passes the link status up to the layers in the middleware protocol group. The SDP searching function in the middleware protocol group can then be used to find out about application programs in the responding Bluetooth device that may provide desired services. The SDP searching function can require several seconds to complete, depending on the complexity of the search and the size of the device's registry.

An example application program service that can be discovered by the SDP searching function is the Wireless Application Environment (WAE) graphical user interface (GUI) function of the Wireless Application Protocol (WAP). WAP-enabled wireless devices can use a microbrowser to display content on a small screen of the device. WAP uses a combination of Internet protocols with other protocols especially modified to work with mobile devices. The Internet protocols are: Point to Point Protocol (PPP), Internet Protocol (IP), and User Datagram Protocol (UDP). The special mobile device protocols are: Wireless Transport Layer Security (WTLS), Wireless Transaction Protocol (WTP), Wireless Session Protocol (WSP), and Wireless Application Environment (WAE). It is the WAE that provides the microbrowser user interface for WAP. In order to establish a connection to send content from the requesting access point device to the WAE microbrowser of the responding user's device, each of the WAP protocol layers WTLS, WTP, WSP, and WAE must be established, which can require several more seconds to complete and possibly significant user interaction on the way.

It can be seen that if the user's mobile Bluetooth device has enough speed to travel across the communications area of the Bluetooth access point before completing downloading data from a network server, the contact with the server will be irretrievably lost.

The IEEE 802.11 Wireless LAN Standard

The IEEE 802.11 Wireless LAN Standard defines at least two different physical (PHY) specifications and one common medium access control (MAC) specification. The IEEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can be configured where the mobile stations communicate with a fixed access point. IEEE 802.11 also supports distributed activities similar those of the Bluetooth piconets. The IEEE 802.11 standard provides wireless devices with service inquiry features similar to the Bluetooth inquiry and scanning features.

In order for an IEEE 802.11 mobile station to communicate with other stations in a network, it must first find the stations. The process of finding another station is by inquiring. Active inquiry requires the inquiring station to transmit queries and invoke responses from other wireless stations in a network. In an active inquiry, the mobile station will transmit a probe request frame. If there is a network on the same channel that matches the service set identity (SSID) in the probe request frame, a station in that network will respond by sending a probe response frame to the inquiring station. The probe response includes the information necessary for the inquiring station to access a description of the network. The inquiring station will also process any other received probe response and Beacon frames. Once the inquiring station has processed any responses, or has decided there will be no responses, it may change to another channel and repeat the process. At the conclusion of the inquiry, the station has accumulated information about the networks in its vicinity. Once a station has performed an inquiry that results in one or more network descriptions, the station may choose to join one of the networks. The IEEE 802.11 Wireless LAN Standard is published in three parts as IEEE 802.11-1999; IEEE 802.11a-1999; and *IEEE* 802.11b-

1999, which are available from the IEEE, Inc. web site http://grouper.ieee.org/groups/802/11.

In the case of IEEE 802.11 mobile stations, if the user's mobile device has enough speed to travel across the communications area of the IEEE 802.11 access point before completing downloading data from a network server, the contact with the server will be irretrievably lost.

High Performance Radio Local Area Network (Hiperlan)

The HiperLAN standard provides a wireless LAN with a high data rate of up to 54 Mbps and a medium-range of 50 meters. HiperLAN wireless LANs provide multimedia distribution with video QoS, reserved spectrum, and good in-building propagation. There are two HiperLAN standards. HiperLAN Type 1 is a dynamic, priority driven channel access protocol similar to wireless Ethernet. HiperLAN Type 2 is reserved channel access protocol similar to a wireless version of ATM. Both HiperLAN Type 1 and HiperLAN Type 2 use dedicated spectrum at 5 GHz. HiperLAN Type 1 uses an advanced channel equalizer to deal with intersymbol interference and signal multipath. HiperLAN Type 2 avoids these interference problems by using OFDM and a frequency transform function. The HiperLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30–50 Mbps.

The HiperLAN Type 1 is a dynamic, priority driven channel access protocol that can form networks of wireless devices. HiperLAN Type 1 networks support distributed activities similar those of the Bluetooth piconets and IEEE 802.11 independent basic service sets (IBSS). The HiperLAN Type 1 standard provides wireless devices with service inquiry features similar to those of the Bluetooth inquiry and scanning features and the IEEE 802.11 probe request and response features. An overview of the HiperLAN Type 1 principles of operation is provided in the publication HiperLAN Type 1 Standard, ETSI ETS 300 652, WA2 December 1997.

HiperLAN Type 2 is a reserved channel access protocol that forms networks. HiperLAN Type 2 networks support distributed activities similar those of the HiperLAN Type 1 networks, Bluetooth piconets and IEEE 802.11 independent basic service sets (IBSS). HiperLAN Type 2 provides high speed radio communication with typical data rates from 6 MHz to 54 Mbps. It connects portable devices with broadband networks that are based on IP, ATM and other technologies. Centralized mode is used to operate HiperLAN Type 2 as an access network via a fixed access point. A central controller (CC) in the fixed access point provides QoS coordinates the access of the mobile stations support. User mobility is supported within the local service area and wide area roaming mobility can also be supported. An overview of the HiperLAN Type 2 principles of operation is provided in the Broadband Radio Access Networks (BRAN), HiperLAN Type 2; System Overview, ETSI TR 101 683 VI.I.1 (2000–02) and a more detailed specification of its ad hoc network architecture is described in HiperLAN Type 2, Data Link Control (DLC) Layer; Part 4. Extension for Home Environment, ETSI TS 101 761-4 V1.2.1 (2000–12).

In the case of HiperLAN mobile stations, if the user's mobile device has enough speed to travel across the communications area of the HiperLAN access point before completing downloading data from a network server, the contact with the server will be irretrievably lost.

What is needed is a way of enabling a mobile wireless device to resume an Internet contact with a web site, which was being conducted through a short range wireless access point, but which has been interrupted by moving the mobile device out of the coverage area of the access point.

SUMMARY OF THE INVENTION

The invention solves the problem of enabling a mobile wireless device to resume an Internet contact with a web site, which was being conducted through a short range wireless access point, but which has been interrupted by moving the mobile device out of the coverage area of the access point. Short range wireless systems include wireless personal area networks (PANs), such as Bluetooth networks and IrDA Infrared Data Protocol networks, and wireless local area networks (LANs), such as the IEEE 802.11 wireless LANs and HiperLAN networks. The invention involves the use of mobile wireless devices that are equipped with both short range wireless communications circuits and with cellular telephone communications circuits. An example of such a mobile wireless device is a Bluetooth-equipped cellular telephone.

During the period when a mobile wireless device is within the coverage area of a short range wireless access point, it sends a request for service to be obtained over the Internet from a network server. The short range wireless access point forwards that request over the Internet to the server, augmented with additional information including the network address and geographic location of the access point. The short range wireless access point receives a response message over the Internet from the server, including a global/local parameter. The global/local parameter will notify the mobile wireless device whether the requested service is available outside the coverage area of the short range wireless access point. The access point forwards the response message to the mobile wireless device, which uses the information in the message to contact the server over the Internet to download web pages or to conduct other server operations.

Regions outside the coverage area of the short range wireless access point are covered by regional cellular telephone access points, such as cellular telephone base stations. Suitable cellular telephone systems include GSM, GPRS, UMTS, EDGE, and the like. In accordance with the invention, if the mobile wireless device detects that it has left the coverage area of the short range wireless access point while in contact with the server, it will determine whether the global/local parameter indicates that the service is global. For example, the server may have been in the process of downloading web pages. If the parameter is global, then the mobile wireless device stores a bookmark of the server's URL, for example the URL and path name for one of the prior web pages downloaded from the server. The mobile wireless device displays a notice to the user offering the user the option of continuing the contact with the server over the regional cellular telephone network.

If the user selects to continue the contact with the server, then a stored handover address is accessed. The handover address may be stored in the mobile wireless device or alternately, it may be stored in the short range wireless access point. The stored handover address may be a default address or alternately, it may be a handover address included in the prior response message from the server. The handover address will typically be the telephone number of a protocol gateway, such as a WAP gateway, connected between the cellular telephone network and the Internet. A cellular telephone connection is made by the mobile wireless device with the regional cellular telephone access point. Then, a cellular telephone call is placed to the protocol gateway. When the call is completed over the telephone network from the mobile wireless device to the protocol gateway, the mobile wireless device sends a message to the protocol gateway.

For example, if the mobile wireless device includes the Wireless Application Protocol (WAP) and if the protocol gateway is a WAP gateway, then a Wireless Session Protocol (WSP) request can be generated in the mobile wireless device. The WSP request is generated by a Wireless Markup Language (WML) "<go>" element in the application program of the mobile wireless device, which specifies the server URL. The message can include an HTTP request method, either the GET or the POST method. When GET is used, the data being sent to the server is appended to the end of the URL. When POST is used, the data is passed in the body of the message. The WAP gateway then converts the WSP request into an HTTP request and forwards it over the Internet to the network server.

Depending on the request, the server responds by resuming the operations it had previously been conducting in its prior contact with the mobile wireless device. For example, WML, HTML, or graphics files can be returned by the server to the WAP gateway. For example, the server can respond to a GET method request by sending the requested web page to the protocol gateway. Alternately, the server can respond by executing CGI, ASP, or JSP scripts or other server programs to dynamically generate WML or HTML content to be returned to the WAP gateway. The protocol gateway then performs an HTML to WML conversion of the content, followed by WML encoding to form the WSP response message. The WSP response message is then transmitted by the WAP gateway over the telephone network to the cellular telephone access device. The cellular telephone access device then transmits the WSP response message containing the content, over the cellular telephone air link to the mobile wireless device.

Additional options can be offered to the user when resuming the service. Alternately, the user may choose to save the URL link in the terminal memory and continue the service later via digital video broadcast or other broadcasting medium.

In this manner, the mobile wireless device can resume an Internet contact with a web site, which was being conducted through a short range wireless access point, but which has been interrupted by moving the mobile device out of the coverage area of the short range wireless access point.

DESCRIPTION OF THE FIGURES

FIG. 1 shows the user's wireless device 100 at a first location "A Street" near two short range wireless access points 140 and 140A and then later at a second location "B Street", near a regional cellular telephone access point 148.

FIG. 1B is a flow diagram of processing a service handoff in the mobile wireless device 100.

FIG. 1C illustrates the Bluetooth packet structure for the user device 100 request to the access point 140, requesting service from the server 180.

FIG. 1D illustrates the Bluetooth packet structure for the access point 140 forwarding a response message 435 to the user device 100, from the server 180.

FIG. 1I illustrates an alternate embodiment of the invention, with the respective protocol stacks for the user's Bluetooth device 100 and access point 140 exchanging content by means of an Access Point Service Indicator (APSI) message 550.

FIG. 2A is a functional block diagram of the wireless access point 140, with the receive packet buffer 252, trigger word table 260, APSI message cache 285, and APSI cache hit logic 283.

FIG. 3 is a flow diagram of the alternate embodiment of the invention, showing sequence of operational steps performed by the user's device 100 in processing an APSI message FIG. 3A is a flow diagram of an alternate embodiment of the invention, which shows the operation of the User's Bluetooth device 100 when receiving an APSI message 550 without any previous warnings.

FIG. 4A shows the alternate embodiment of the invention with the Bluetooth packet structure for an inquiry packet 500 sent by a Bluetooth access point device to the user's device 100.

FIG. 4B shows the alternate embodiment of the invention with the Bluetooth frequency hop synchronization (FHS) packet structure for an inquiry response packet 510 sent by the user's device 100.

DISCUSSION OF THE PREFERRED EMBODIMENT

Figure 1A:
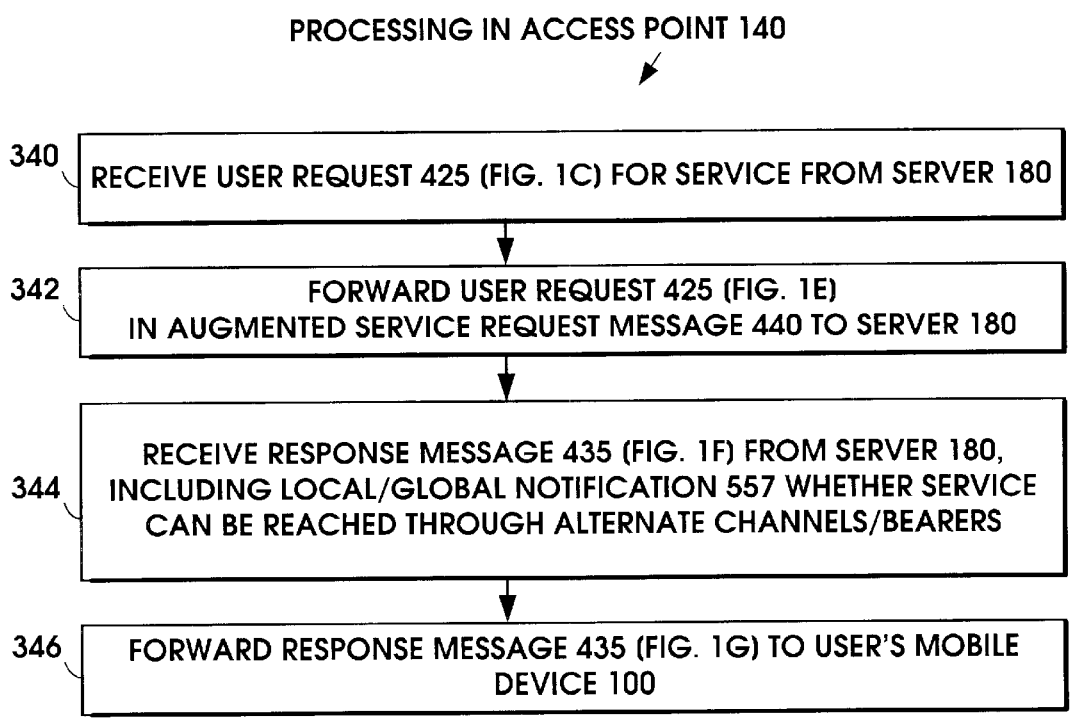
FIG. 1A is a flow diagram of processing a service request in the access point 140.

FIG. 1 shows the user's wireless device 100 at a first location "A Street" near two short range wireless access points 140 and 140A and then later at a second location "B Street", near a regional cellular telephone access point 148. The mobile wireless device 100 of FIG. 1, is equipped with circuits 103 for short range wireless systems and circuits 105 for cellular telephone communications systems. Short range wireless systems include wireless personal area networks (PANs), such as Bluetooth networks and IrDA Infrared Data Protocol networks, and wireless local area networks (LANs), such as the IEEE 802.11 wireless LANs and HiperLAN networks. Cellular telephone communications systems include GSM, GPRS, UMTS, EDGE, and the like. An example of such a mobile wireless device 100 is a Bluetooth-equipped GSM cellular telephone.

During an initial period when the mobile wireless device 100 is within the coverage area of the short range wireless access point 140, it sends a request for service to be obtained, for example, over the Internet 144 from network server 180. In this example, the short range wireless access point 140 is a Bluetooth access point and the short range wireless circuits in the mobile wireless device 100 are Bluetooth circuits. The user has previously actuated the Bluetooth mode button "BT" on the keypad 104 and the Bluetooth circuits have completed their exchanged of inquiry, paging, and service discovery packets with the Bluetooth access point 140. In this example, the user wishes to view the daily news service provided by the server 180.

FIG. 1A is a flow diagram of processing the user's service request in the access point 140. Step 340 receives the user request 420, which is shown in FIG. 1C. The Bluetooth packet structure 420 for the user's request 425, includes the access code 422 for the piconet master in the piconet formed by the mobile Bluetooth device 100 and the Bluetooth access point 140, the header 424 containing the slave device number 421 and the packet type 423, and the payload portion. The payload portion includes the payload header 427 and the payload data 428. The user's service request 425 to the server 180 is contained in the payload data 428.

Figure 1E:
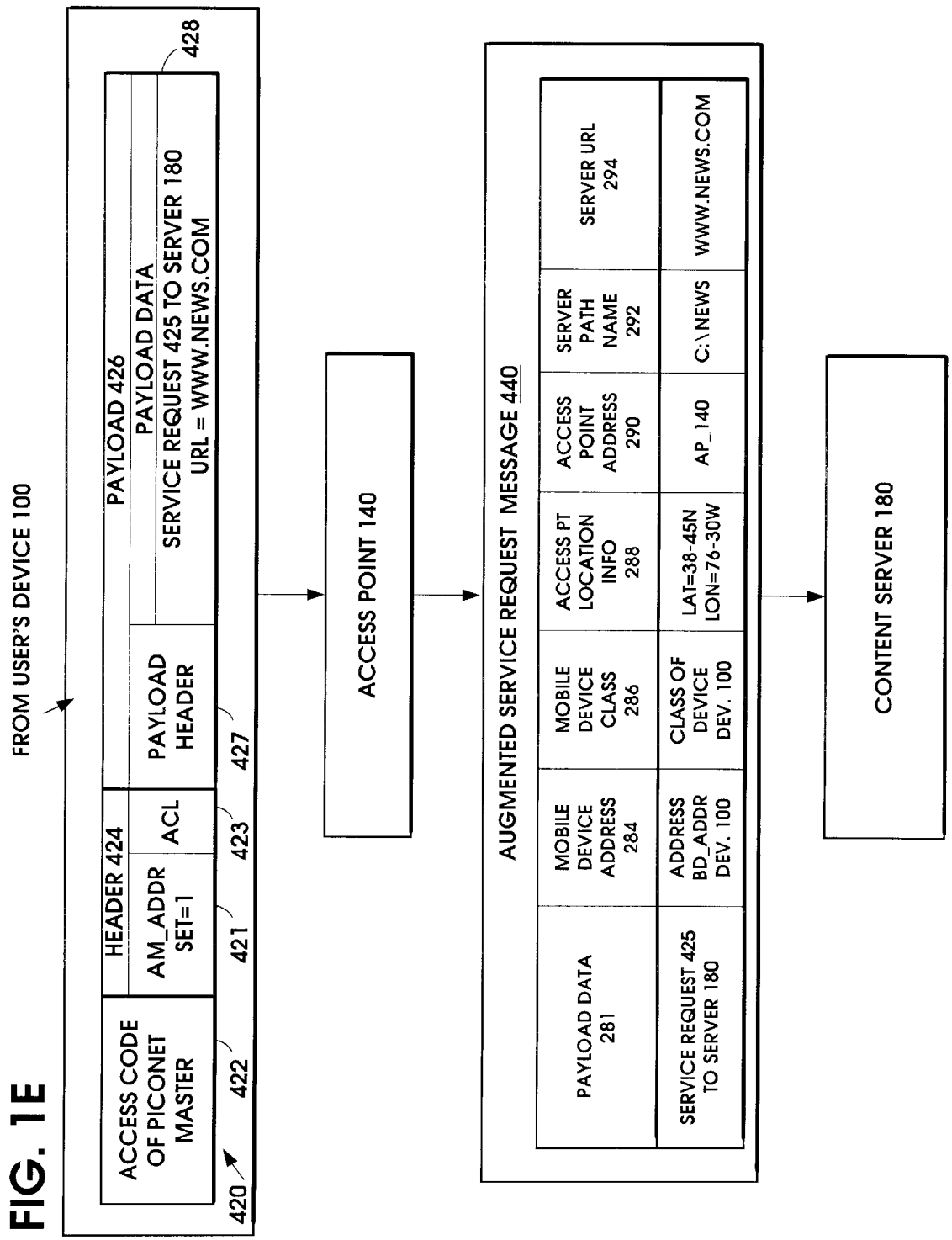
FIG. 1E is a data flow diagram showing the service request packet 420 from the user's device 100 being forwarded by the access point 140 in the augmented service request message 440, to the content server 180.

In step 342 of the flow diagram of FIG. 1A, the Bluetooth access point forwards the user's service request 425 in an augmented service request message 440 to the server 180. FIG. 1E is a data flow diagram showing the service request 425 from the user's device 100 being forwarded by the access point 140 in the augmented service request message 440, over, for example, the LAN 142 and the Internet 144 to the content server 180. The augmented service request message 440 may include the payload data 281, the address 284 of the user's Bluetooth device 100, its class of device 286, access point geographic location information 288, the access point address 290, the destination server path name 292 and the destination server URL 294. FIG. 1E shows the augmented service request message 440 being sent to the news server 180.

Figure 1F:
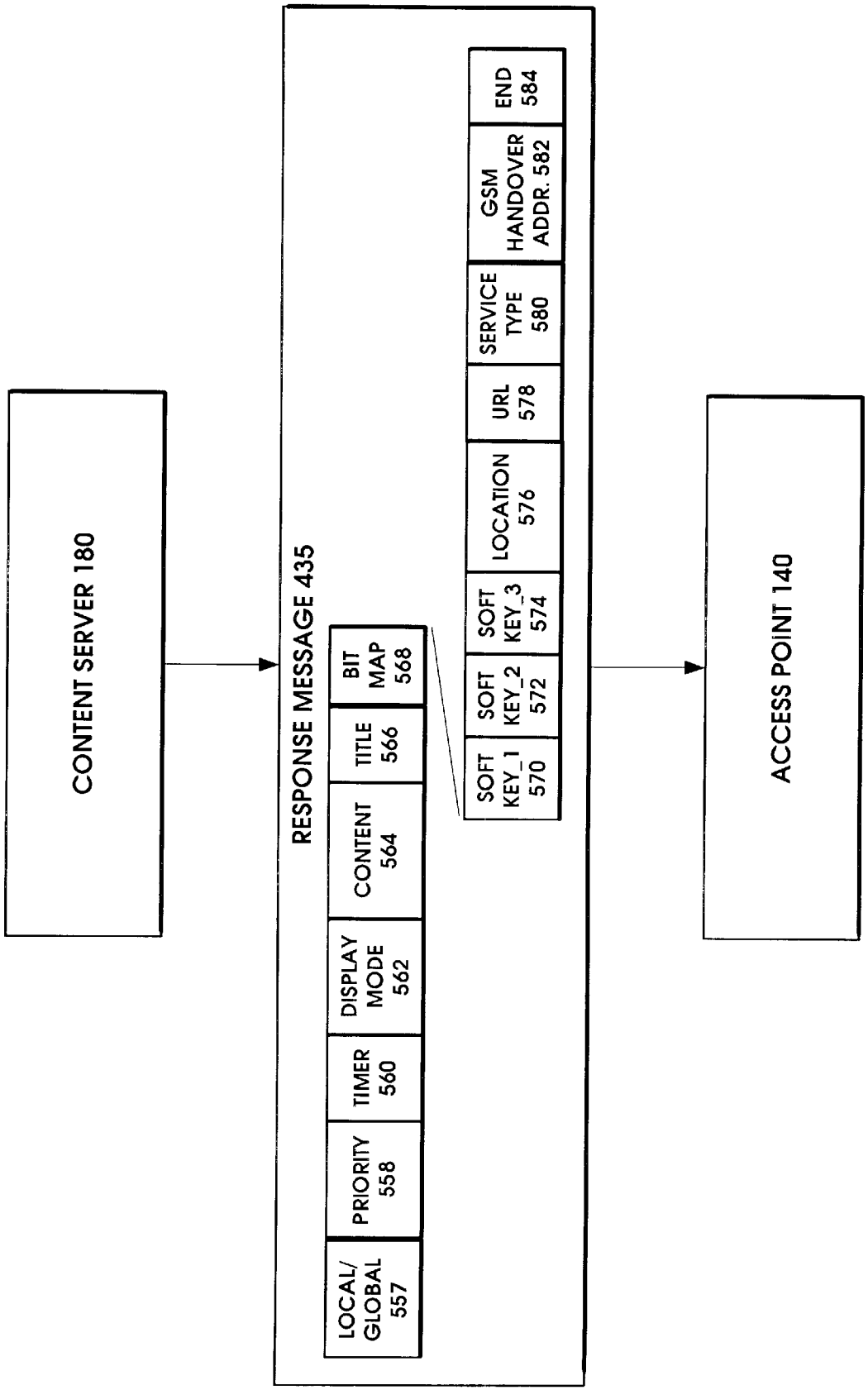
FIG. 1F is a data flow diagram showing the content server 180 returning a response message 435 to the access point 140, including a local/global parameter 557 and a handoff address 582.

In step 344 of the flow diagram of FIG. 1A, the Bluetooth access point receives a response message 435, shown in FIG. 1F, from server 180. FIG. 1F is a data flow diagram showing the content server 180 returning a response message 435 to the access point 140, including a local/global parameter 557 and a handoff address 582. The local/global parameter 557 specifies whether the service from the server 180 can be reached also through alternate channels or bearers. The response message 435 includes the local/global parameter 557, and may also include priority information 558, timer information 560, display mode information 562, content 564, a title 566, a bit map 568, soft key_1 selection information 570, soft key_2 selection information 572, soft key_3 selection information 574, location information 576, URL information 578, service type information 580, the handoff address 582 and an end marker 584.

Figure 1G:
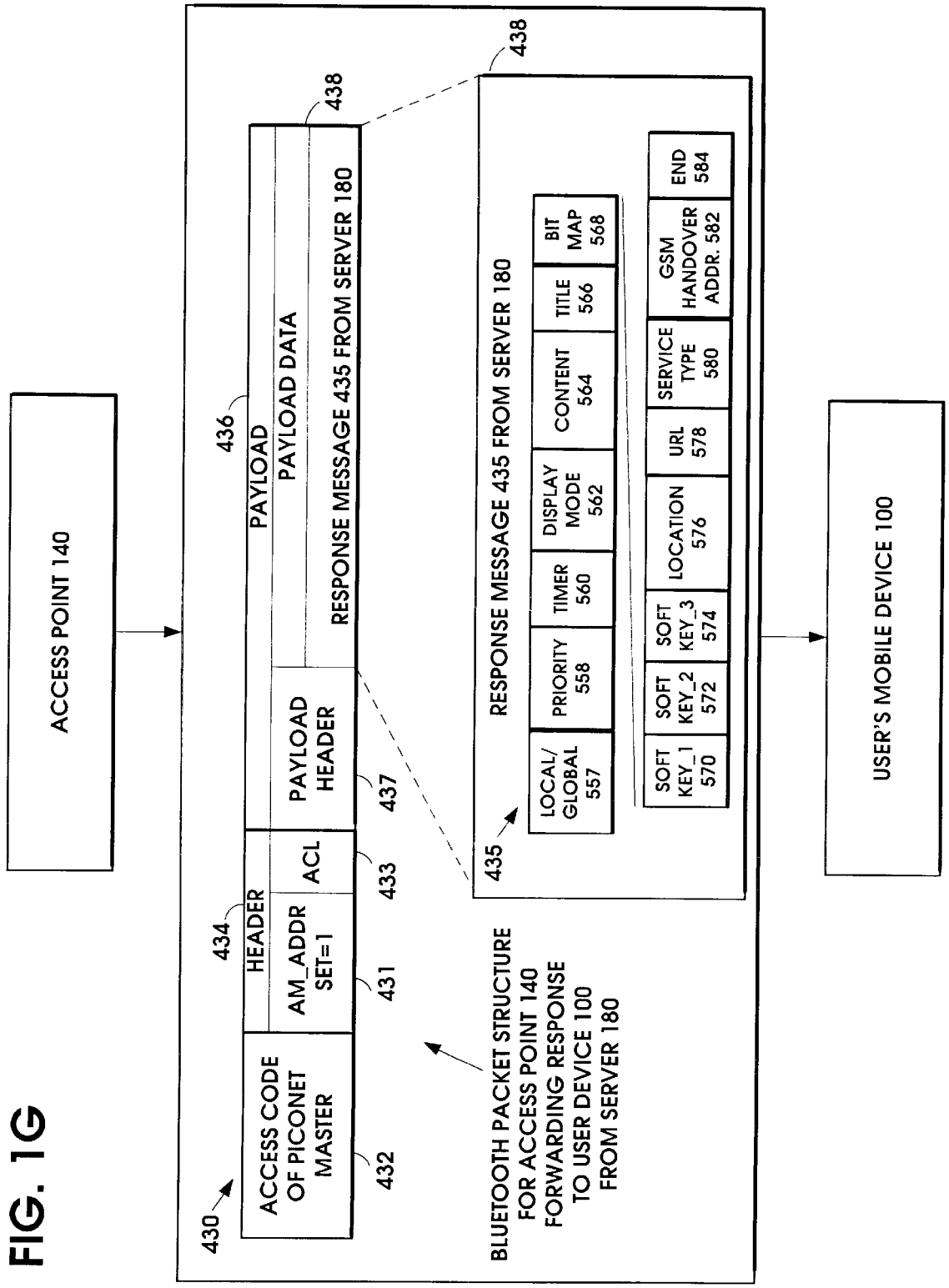
FIG. 1G is a data flow diagram showing the access point 140 sending the response message 435 to the user's mobile device 100.

In step 346 of the flow diagram of FIG. 1A, the Bluetooth access point forwards the response message 435 to the user's Bluetooth device 100, as shown in FIGS. 1D and 1G. FIG. 1D illustrates the Bluetooth packet structure 430 for the access point 140 forwarding a response message 435 to the user device 100, from the server 180. FIG. 1G is a data flow diagram showing the access point 140 sending the response message 435 to the user's mobile device 100. The Bluetooth packet structure 430 for the user's request 435, includes the access code 432 for the piconet master in the piconet formed by the mobile Bluetooth device 100 and the Bluetooth access point 140, the header 434 containing the slave device number 431 and the packet type 433, and the payload portion 436. The payload portion includes the payload header 437 and the payload data 438. The response message 435 is contained in the payload data 438. FIG. 1B is a flow diagram of processing in the mobile wireless device 100. In Step 350, the mobile wireless device 100 receives the server response message 435 and in step 352, it stores the local/global parameter 557 in a buffer in its memory 202, as shown in FIG. 1J. Optionally, the mobile wireless device 100 receives the handover address 582, which it stores in a buffer in its memory 202, as shown in FIG. 1J. The mobile wireless device 100 uses the information in the server response message 435 to contact the server over the Internet to download web pages or to conduct other server operations.

Regions outside the coverage area of the short range wireless access point 140 of FIG. 1, are typically covered by regional cellular telephone access points 148, such as cellular telephone base stations. Suitable cellular telephone systems include GSM, GPRS, UMTS, EDGE, and the like. In accordance with the invention, if the mobile wireless device 100 detects that it has left the coverage area of the short range wireless access point 140 while in contact with the server 180, it will determine whether the global/local parameter 557 indicates that the service is global. This step is shown as step 354 in FIG. 1B. If decision block 356 determines that the parameter 557 is "Local", then step 358 ends the service with the server 180. Alternately, if the decision block 356 determines that the parameter 557 is "Global", then the process of FIG. 1B flows to step 360. As an example, the server 180 may have been in the process of downloading web pages when interrupted by the motion of the mobile device 100. If the parameter 557 is global, then the mobile wireless device 100 stores a bookmark of the server's URL 123, as shown in step 360. For example, the URL and path name may be saved for one of the prior web pages downloaded from the server 180. Then in step 362, the mobile wireless device 100 displays in FIG. 1, a notice 121 "GLOBAL" or some expression having a similar meaning, offering the user the option of continuing the contact with the server 180 over the regional cellular telephone network 116.

If the user selects to continue the contact with the server, then a stored handover address is accessed, as shown in step 364. The handover address may be stored in the mobile wireless device 100 or alternately, it may be stored in the short range wireless access point 140. The stored handover address may be a default address or alternately, it may be a handover address included in the prior server response message 435 from the server 180. The handover address will typically be the telephone number of a protocol gateway 118, such as a WAP gateway, connected between the cellular telephone network 116 and the Internet 144. In Step 364, the user actuates the cellular telephone mode button "GSM" on the keypad 104 and makes a cellular telephone connection between the mobile wireless device 100 and the regional cellular telephone access point 148. Then, a cellular telephone call is placed over the telephone network 116 to the protocol gateway 118. When the call is completed over the telephone network 116 from the mobile wireless device 110 to the protocol gateway 118, the mobile wireless device 100 sends a message to the protocol gateway 118.

For example, if the mobile wireless device 100 includes the Wireless Application Protocol (WAP) and if the protocol gateway is a WAP gateway, then a Wireless Session Protocol (WSP) request can be generated in the mobile wireless device 100. The WSP request is generated by a Wireless Markup Language (WML) "<go>" element in the application program 106 of the mobile wireless device 100, which specifies the server URL. The message can include an HTTP request method, either the GET or the POST method. When GET is used, the data being sent to the server 180 is appended to the end of the URL. When POST is used, the data is passed in the body of the message. The WAP gateway 118 then converts the WSP request into an HTTP request and forwards it over the Internet 144 to the server 180.

Depending on the request, the server 180 responds by resuming the operations it had previously been conducting in its prior contact with the mobile wireless device 100. For example, WML, HTML, or graphics files can be returned by the server 180 to the WAP gateway 118. For example, the server 180 can respond to a GET method request by sending the requested web page to the protocol gateway 118. Alternately, the server 180 can respond by executing CGI, ASP, or JSP scripts or other server programs to dynamically generate WML or HTML content to be returned to the WAP gateway 118. The protocol gateway 118 then performs an HTML to WML conversion of the content, followed by WML encoding for form the WSP response message. The WSP response message is then transmitted by the WAP gateway 118 over the telephone network 116 to the cellular telephone access device 148. The cellular telephone access device 148 then transmits the WSP response message containing the content, over the cellular telephone air link to cellular telephone antenna 105 and circuits 208 of the mobile wireless device 100. Additional options can be offered to the user when resuming the service. Alternately, the user may choose to save the URL link in the terminal memory and continue the service later via digital broadcast or other broadcasting medium.

In this manner, the mobile wireless device can resume an Internet contact with a web site, which was being conducted through a short range wireless access point, but which has been interrupted by moving the mobile device out of the coverage area of the short range wireless access point. This inventive system can easily be implemented also to any other existing or future protocol techniques.

The invention is described for mobile wireless devices and wireless telephones implementing the Wireless Application Protocol (WAP) standard. Other protocols that can be used in the invention to access the Internet include I-Mode protocol and mobile IPv6 protocol. The user's WAP-enabled mobile wireless device 100 can be a wireless mobile phone, pager, two-way radio, smartphone, personal communicator, or the like. The user's WAP-enabled portable wireless device 100 accesses a small file called a deck which is composed of several smaller pages called cards which are small enough to fit into the display area of the device's microbrowser 102. The small size of the microbrowser 102 and the small file sizes accommodate the low memory constraints of the portable wireless device 100 and the low-bandwidth constraints of a wireless network. The cards are written in the Wireless Markup Language (WML) which is specifically devised for small screens and one-hand navigation without a keyboard. The WML language is scaleable from two-line text displays on the microbrowser 102 of a cellular telephone, up through large LCD screens found on smart phones and personal communicators. The cards written in the WML language can include programs written in WMLScript, which is similar to JavaScript, but makes minimal demands on memory and CPU power of the device 100 because it does not contain many of the unnecessary functions found in other scripting languages. The microbrowser 102 enables the user to navigate through the cards being displayed and to select options that are programmed by the application programs 106.

The Nokia WAP Client Version 2.0 is a software product containing the components necessary to implement the WAP client on the wireless device 100. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs 106 stored in the wireless device 100 interact with the WAP Client to implement a variety of communications applications. Details of the Nokia WAP Client Version 2.0 can be found in the online paper: Nokia WAP Client Version 2.0, Product Overview, Nokia Internet Communications, 2000, www.nokia.com/corporate/wap.

The WAP Client includes the Wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client, which includes security features, such as the public and private keys and service certificates, needed for user authentication and digital signatures. Additionally, it has the ability to perform cryptographic operations to encrypt and decrypt messages.

The WAP protocol gateway 118 links the Internet 144 and the telephone network 116. The WAP protocol gateway 118 includes the Wireless Public Key infrastructure (PKI) feature to help provide a secure Internet connection to the wireless device 100. The WAP protocol gateway 118 enables the WAP-enabled wireless device 100 to access Internet applications such as headline news, exchange rates, sports results, stock quotes, online travel and banking services, or to download distinctive ringing tones.

The user's WAP-enabled portable wireless device 100 communicates with the cellular telephone access point 148 and can exchange messages for distances up to several kilometers. The types of wireless networks supported by the WAP standard include GSM, GPRS, UMTS, EDGE, CDPD, CDMA, TDMA, 3G-Broadband, and the like.

The overall process of communication between the user's WAP-enabled wireless device (the client) 100, through the WAP protocol gateway 118, to the server 180 resembles the way Web pages are served on the Internet using the HyperText Transfer Protocol (HTTP) or World Wide Web protocol:

[1] The user presses a phone key on the user's device 100 related to the Uniform Resource Locator (URL) of the server 180.
[2] The user's device 100 sends the URL, via the cellular telephone access point 148 and the telephone network 116, to the gateway 118 using WAP protocols.
[3] The gateway 118 translates the WAP request into an HTTP request and sends it over the Internet 144 to the server 180, via Transmission Control Protocol/Internet Protocol (TCP/IP) interfaces.
[4] The server 180 handles the request just like any other HTTP request received over the Internet. The server 180 either returns a WML deck or a HyperText Markup Language (HTML) page back to the gateway 118 using standard server programs written, for example in Common Gateway Interface (CGI) programs, Java servlets, or the like.
[5] The gateway 118 receives the response from the server 180 on behalf of the user's device 100. If the response is an HTML page, it gets transcoded into WML if necessary. Then the WML and WMLScript coding is encoded into a byte code that is then sent to the user's device 100.
[6] The user's device 100 receives the response in the WML byte code and displays the first card in the deck on the microbrowser 102 to the user.

In FIG. 1, the protocol gateway 118 includes a WAP protocol stack organized into five different layers. An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as GSM, GPRS, UMTS, EDGE, etc. Additional information about the WAP standard and the WAP protocol stack can be found in the book by Charles Arehart, et al. entitled, Professional WAP, published by Wrox Press Ltd., 2000 (ISBN 1-861004-04-1).

Figure 1H:
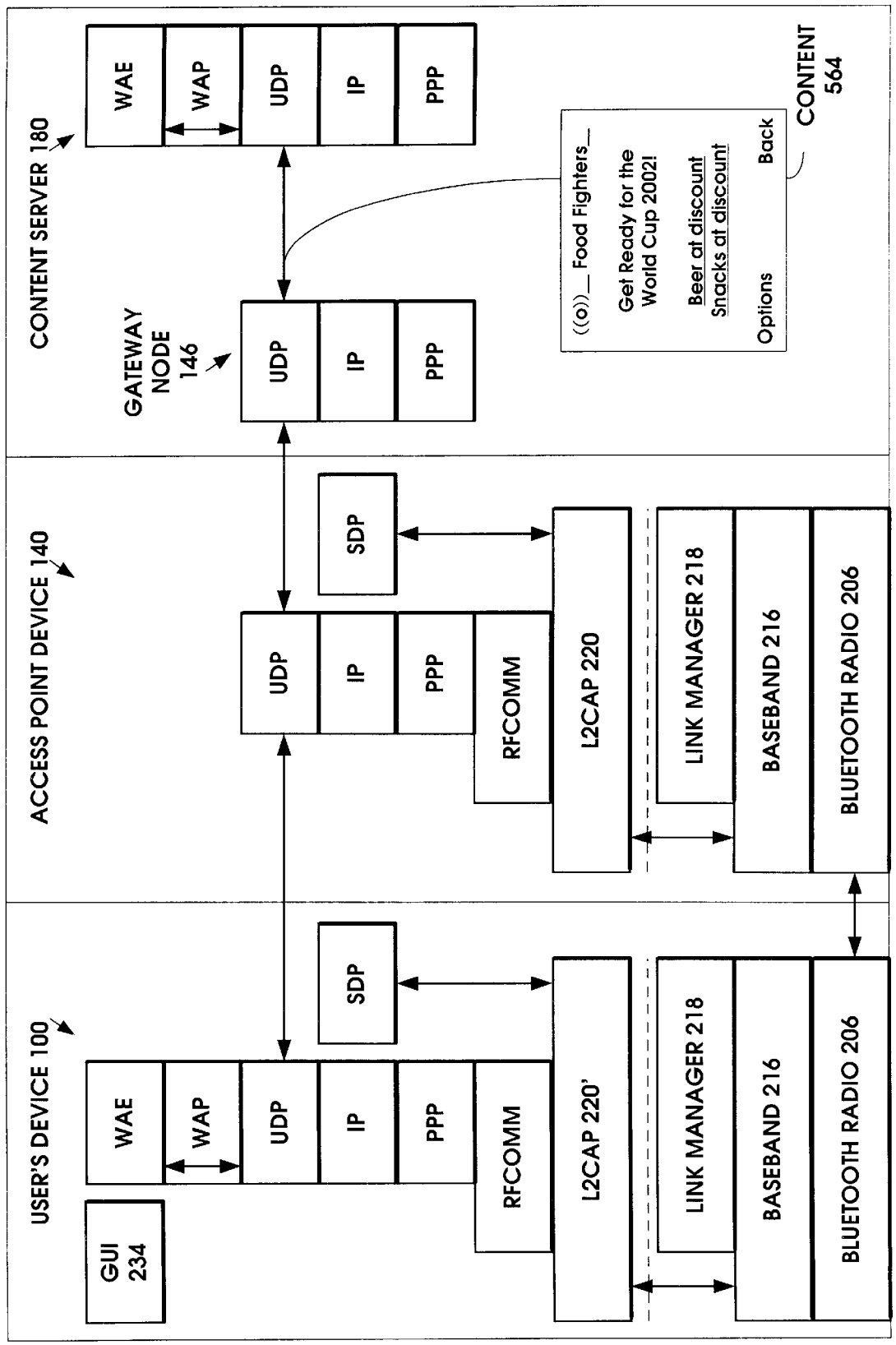
FIG. 1H illustrates the respective prior art protocol stacks for the user's Bluetooth device 100, access point 140, and content server 180.
Figure 11:
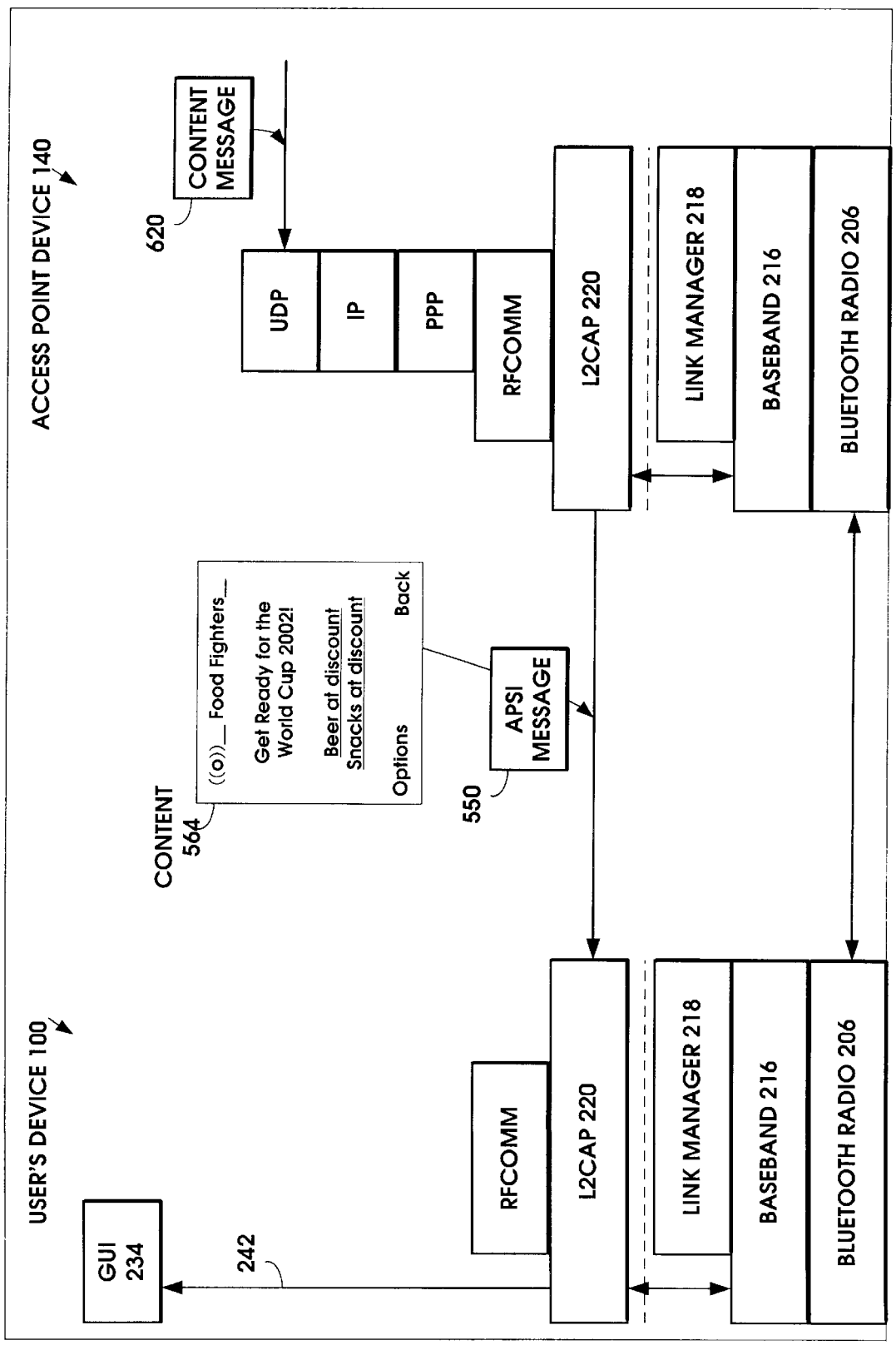
Figure 1J:
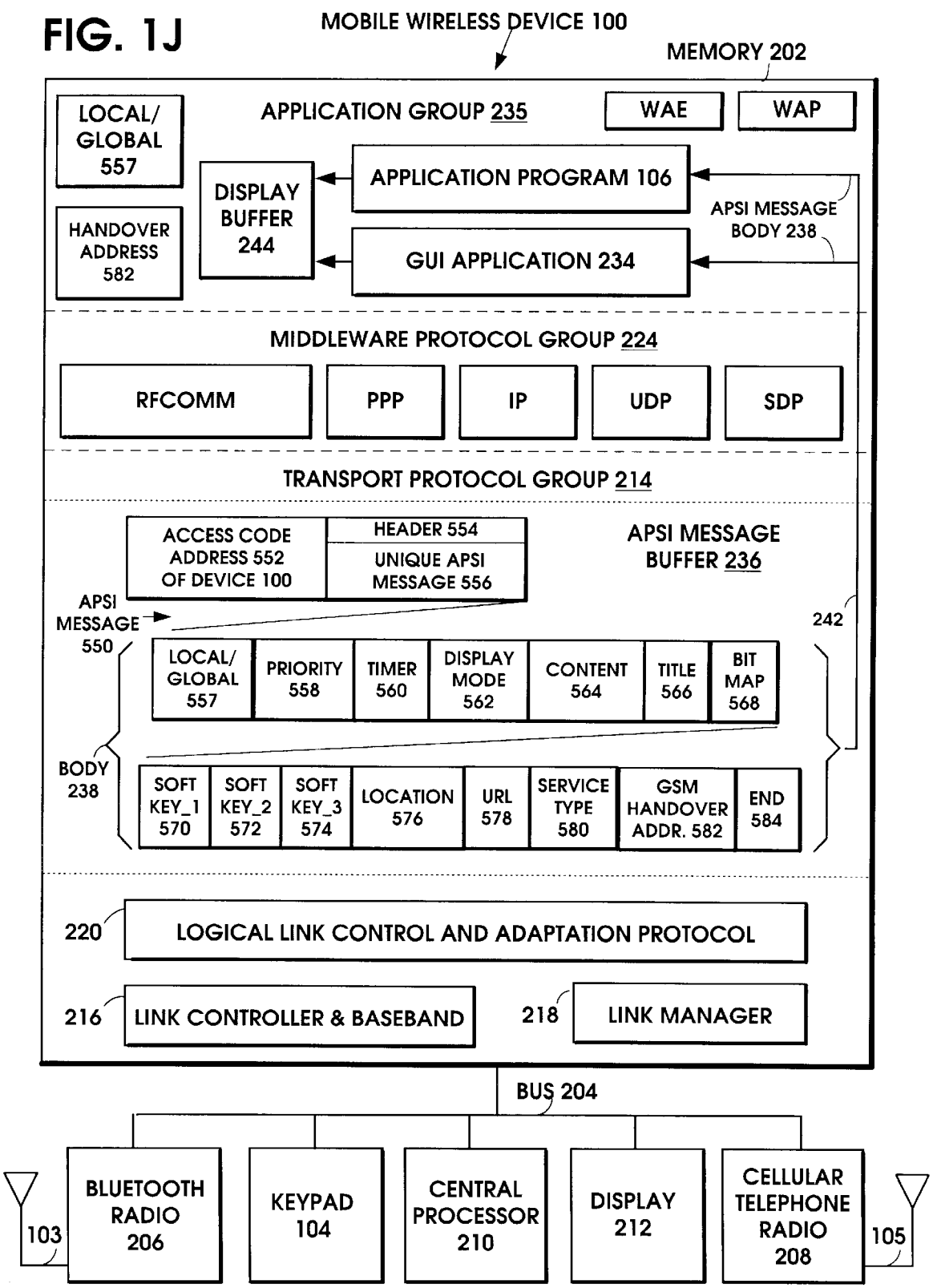
FIG. 1J is a functional block diagram of the user's wireless device 100, showing the APSI message buffer 236 in the alternate embodiment of the invention.

FIG. 1H illustrates the respective prior art protocol stacks used for the user's Bluetooth device 100, the Bluetooth access point 140, and the content server 180. As is described in detail in the Bluetooth specification, the protocol stack for Bluetooth device is made up of three protocol groups: the transport protocol group, the middleware protocol group and the application group. The transport protocol group includes the link controller and baseband 216, the link manager 218 and the logical link control and adaptation protocol (L2CAP) 220'. The transport protocol group enables Bluetooth devices to locate each other and to create, configure, and manage the physical and logical links that allow higher layer protocols and applications to pass data through these transport protocols. The middleware protocol group includes a serial port emulator protocol called RFCOMM, and the Internet protocols: point-to-point protocol (PPP), Internet protocol (IP), and user datagram protocol (UDP). The application group includes the wireless application protocol (WAP) and the wireless application environment (WAE), as well as graphic user interface (GUI) programs 234 and application programs. Also shown for the user's device 100 is the service discovery protocol (SDP), which enables devices to discover services offered by other Bluetooth devices. This constitutes the prior art Bluetooth protocol stack. As is shown in FIG. 1H, the access point 140 includes the same transport protocol group and middleware protocol group protocol layers. Also shown in FIG. 1H is a gateway node 146, which includes the UDP, IP, and PPP layers. The content server 180 includes the middleware layers and the WAP and WAE layers of the application group. The purpose of FIG. 1H is to illustrate that the prior art requires the user's device 100 to set up all of the protocol layers in the middleware protocol group and in the application group in order to receive even the most simple content 564 from the content server 180. The time required to set up all of the protocol layers in the user's device 100 in order to establish a connection with the access point device 140 can exceed the short interval during which the user's device 100 is within communication range of the access point 140.

FIG. 1I illustrates the respective protocol stacks for the user's Bluetooth device 100 and the access point 140 exchanging content 564 by means of an Access Point Service Indicator (APSI) message 550, in accordance with an alternate embodiment of the invention. As will be described below, according to one alternate embodiment of the invention, the L2CAP layer 220 in the user's device 100 is modified to detect a unique class of device (CoD) value in either a paging packet or an inquiry response packet from the L2CAP layer 220 in the access point 140. When the user's device 100 detects the arrival of a paging packet with the unique CoD value, it indicates that the next packet to be sent by the access point 140 is an access point service indication (APSI) message. Then, when the user's device 100 receives the next packet from the access point, the L2CAP layer 220 in the user's device 100 loads it into an APSI message buffer 236. The L2CAP layer verifies that the packet header for the APSI message 550 has a unique message ID indicating that it is in fact, an APSI message from the access point. Then, the L2CAP layer immediately passes the APSI message directly up to the GUI application layer 234, thereby bypassing the middleware protocol layers as well as the WAP layers in the user's device 100. This significantly reduces the amount of time necessary to set up a connection to enable the user's device 100 to receive and display content 564 contained in the APSI message 550.

Also shown in FIG. 1I is the receipt by the access point device 140 of a content message 620. As will be described below, if the access point device 140 does not currently have the APSI message 550 stored in its memory, then the access point 140 accesses the content 564 from a content server such as the content server 180 in FIG. 1. The resulting content message 620 contains the content 564 which is assembled by the access point 140 into the APSI message 550 of FIG. 1I.

According to another alternate embodiment of the invention, the user's Bluetooth device 100 does not need to receive any previous indication of the arriving APSI message 550. In this alternate embodiment, immediately after successful paging, the APSI message 550 packet having a unique message ID is received by the user's device 100. The user's Bluetooth device L2CAP layer determines that the message is, in fact, an APSI message 550 from the access point device 140. The user's Bluetooth device L2CAP layer loads the APSI message into an APSI message buffer 236. Then, the L2CAP layer immediately passes the APSI message directly up to the GUI application layer 234, thereby bypassing the middleware protocol layers as well as the WAP layers in the user's device 100. This significantly reduces the amount of time necessary to set up a connection to enable the user's device 100 to receive and display content 564 contained in the APSI message 550.

FIG. 1J is a functional block diagram of an the user's Bluetooth device 100, showing the APSI message buffer 236, in accordance with the invention. FIG. 1J shows a memory 202, connected by means of a bus 204 to a Bluetooth radio 206 and its antena 103, a keypad 104, a central processor 210, a display 212, and a cellular telephone radio 208 and its antenna 105. The memory 202 stores program instructions which are sequences of operational steps, which, when executed by the central processor 210, carry out the function of the invention. The memory 202 is shown partitioned into transport protocol group 214, middleware group 224, and application group 235. Within the transport protocol group 214, there is a link controller and baseband 216, a link manager 218, a logical link control and adaptation protocol 220, and an APSI message buffer 236. In the middleware protocol group 224 is the RFCOMM, the PPP, the IP, the UDP and SDP protocol layers. In the application group 235 is a GUI application 234, an application program 106, a display buffer 244, the WAE and the WAP protocol layers, a buffer for the local/global parameter 557 and a buffer for the handoff address 582. In accordance with an alternate embodiment of the invention, APSI message 550 contained in the APSI message buffer 236 is recognized by the logical link control and adaptation protocol 220, and the body 238 of the APSI message 550 is immediately provided over the path 242 to the GUI application 234 and the application program 106.

FIG. 2A is a functional block diagram of an alternate embodiment the Bluetooth access point 140, with a receive packet buffer 252, a trigger word table 260, an APSI message cache 285, and an APSI cache hit logic 283. A server notification message table 280 is also shown in FIG. 2A. In accordance with the invention, the access point 140 stores Access Point Service Indicator (APSI) messages in the APSI message cache 285, which characterize service platform offerings. The APSI message 550 includes a header 554 which contains a unique APSI message ID 556. Also included in the APSI message 550 in a body portion 238, is the local/global parameter 557, priority information 558, timer information 560, display mode information 562, content 564, a title 566, a bit map 568, soft key_1 selection information 570, soft key_2 selection information 572, soft key_3 selection information 574, location information 576, URL information 578, service type information 580, the handoff address 582 and an end marker 584. When the user's device 100 sends either a paging packet or an inquiry response packet, such as inquiry response packet 510, to the access point 140, the access point uses the information in the received packet as stimuli to be matched with trigger words stored in the trigger word table 260. For example, the address of the device 100 in field 520 can be matched with address values 266 in the trigger word table 260. Also, the class of device of the device 100 in field 522 can be compared with class of device values 268 stored in the trigger word table 260. If there is a match, then the APSI message cache 285 is checked by means of the APSI cache hit logic 283, to determine if a corresponding APSI message is stored in the cache 285. If there is a corresponding APSI message in the cache 285, then the APSI message is immediately sent to the mobile Bluetooth device 100. If there is no corresponding APSI message in the message cache 285, then the APSI cache hit logic 283 signals the server notification message table 280 to send a server notification message 610 to a content server specified in the message.

Figure 2B:
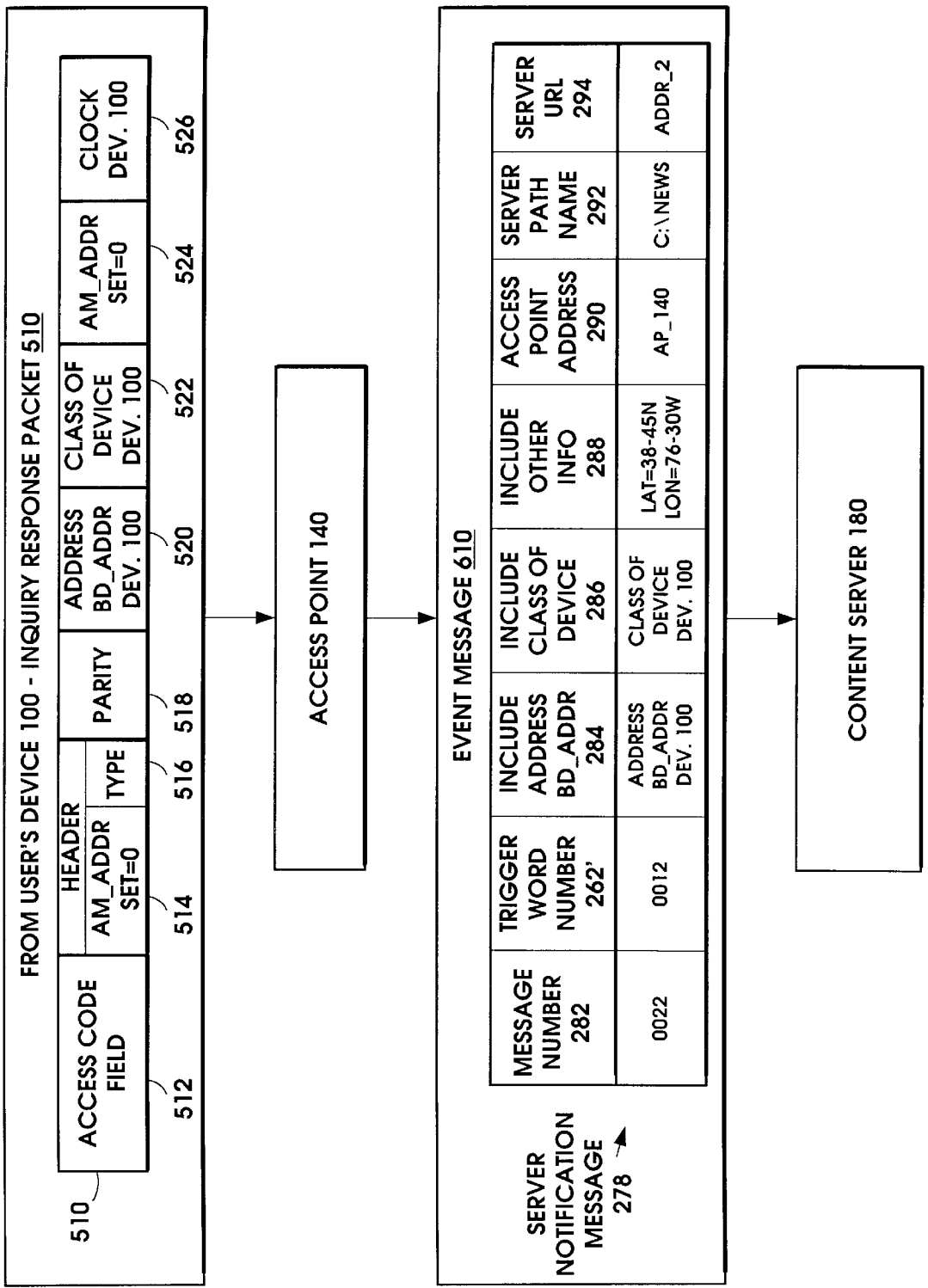
FIG. 2B is a data flow diagram of the alternate embodiment of the invention, showing the inquiry response packet 510 from the user's device 100 being detected by the access point 140 and the access point sending an event message 610 to the content server 180 in response to determining that the access point 140 does not have a corresponding APSI message in its cache.

FIG. 2B is a dataflow diagram of an alternate embodiment of the invention, showing an inquiry response packet 510 from the user's device 100 being detected by the access point 140. FIG. 2B shows the access point sending an event message 610 to the content server 180 in response to the access point determining that it does not have a corresponding APSI message in its cache 285. As is shown in FIG. 2B, the event message 610, includes specific data values for a server notification message number 282, trigger word number 262', the address 284 of the user's Bluetooth device 100, its class of device 286, other information 288, the access point address 290, the destination server path name 292 and the destination server URL 294. FIG. 2B shows the event message 610 being sent to the news server 180.

Figure 2C:
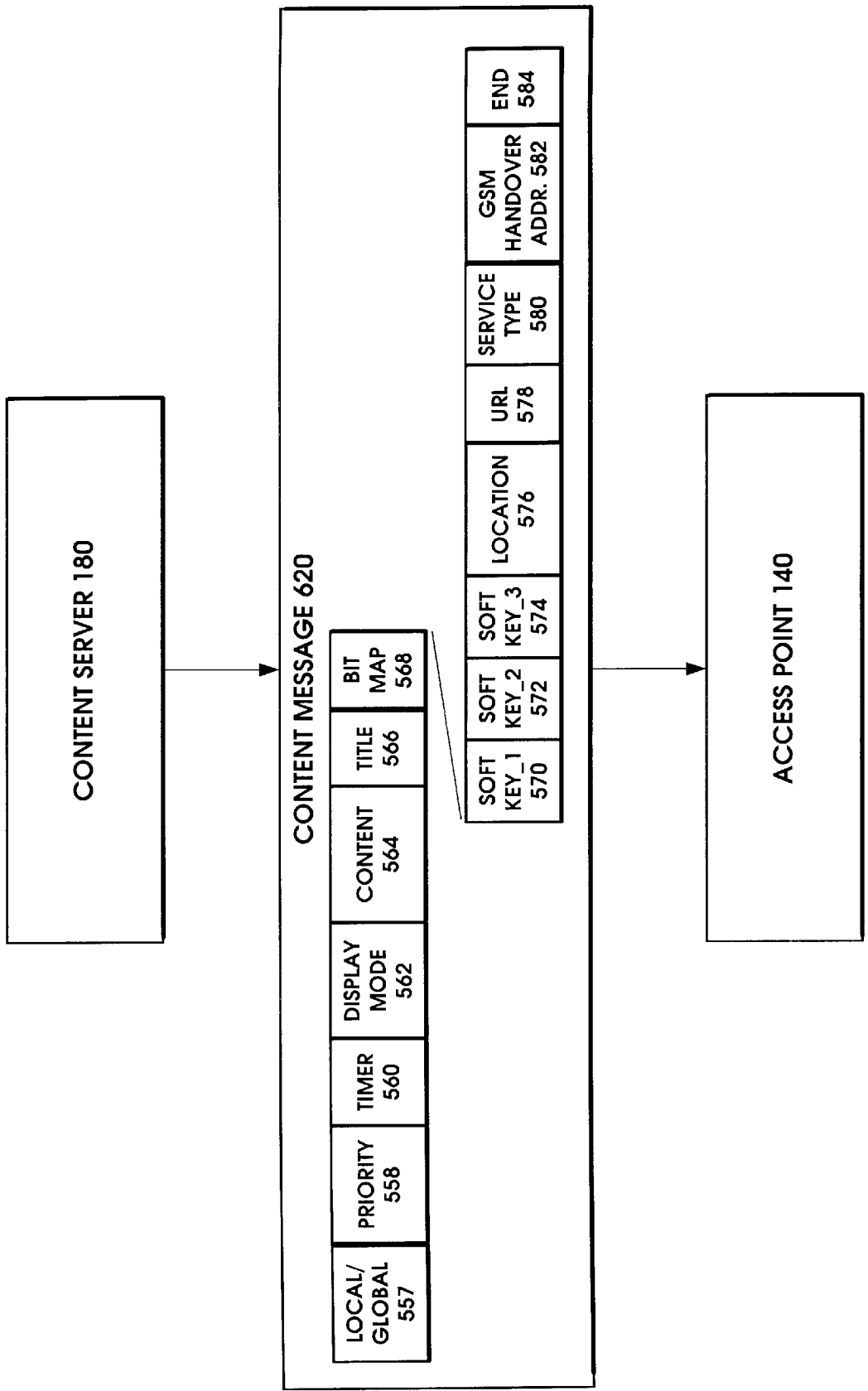
FIG. 2C is a data flow diagram the alternate embodiment of the invention, showing the content server 180 returning a content message 620 to the access point 140, in response to the server having processed the event message 610.

FIG. 2C is a dataflow diagram of an alternate embodiment of the invention, showing the content server 180 returning a content message 620 to the access point 140, in response to the server 180 having processed the event message 610. FIG. 2C shows that the content message 620 includes content information, which will ultimately be incorporated into the APSI message 550.

Figure 2D:
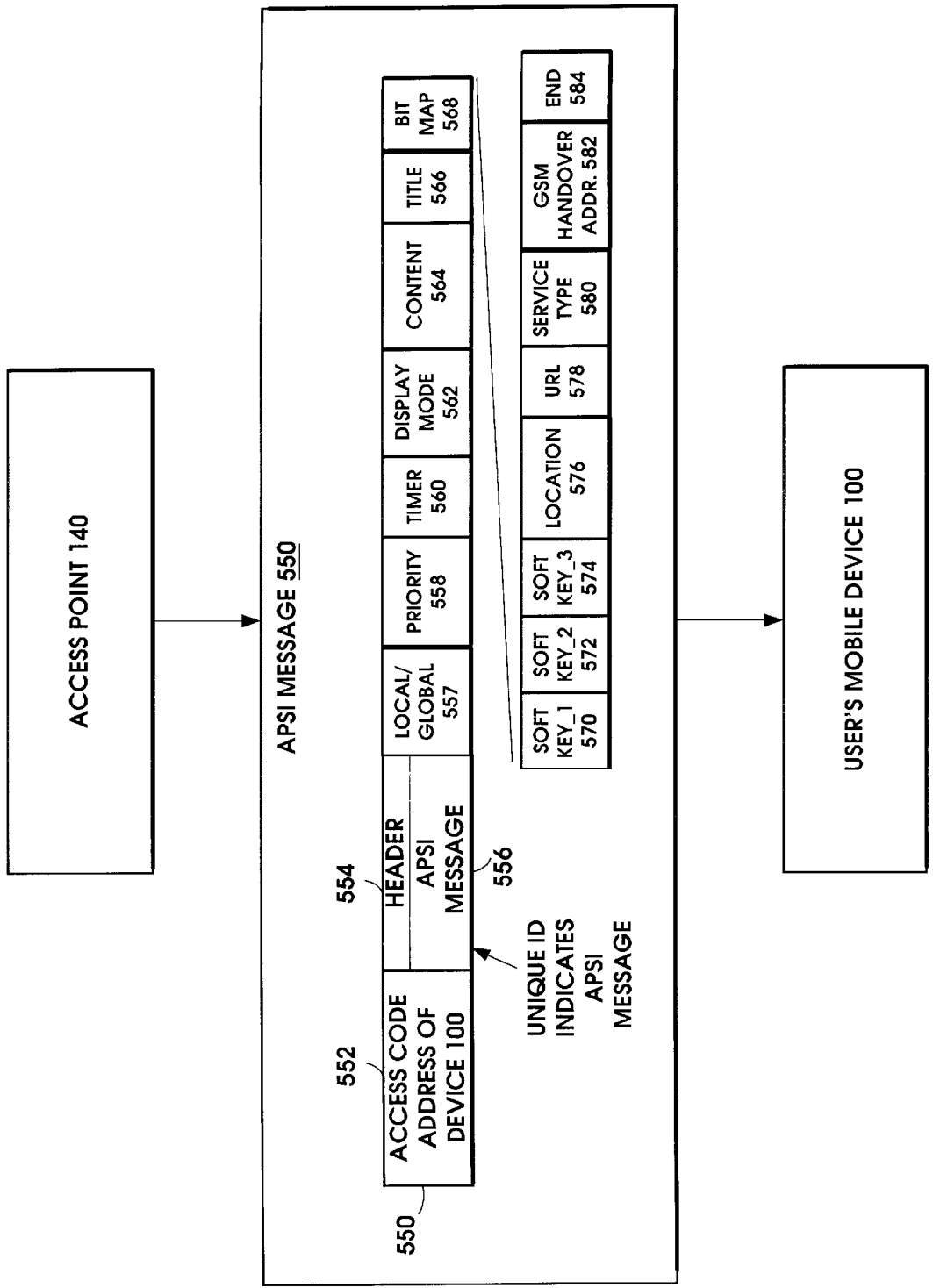
FIG. 2D is a data flow diagram showing the alternate embodiment of the invention, the access point 140 sending the APSI message 550 to the user's mobile device 100, which the access point has assembled from the content message 620 received from the server 180.

FIG. 2D is a dataflow diagram of an alternate embodiment of the invention, showing the access point 140 sending the APSI message 550 to the user's mobile device 100, which the access point 140 has assembled from the content message 620 received from the server 180.

FIG. 3 is a flow diagram of the operation of the User's Bluetooth device 100 according to one alternate embodiment of the invention when receiving an APSI message 550. During the period when the mobile wireless device 100 is within the coverage area of the short range wireless access point 140, it sends a request for service to be obtained over the Internet from the network server 180. The short range wireless access point forwards that request over the Internet to the server, augmented with additional information including the network address and geographic location of the access point. The short range wireless access point receives a response message over the Internet from the server, including a global/local parameter. The global/local parameter will notify the mobile wireless device whether the requested service is available outside the coverage area of the short range wireless access point. The access point forwards the response message to the mobile wireless device, which uses the information in the message to contact the server over the Internet to download web pages or to conduct other server operations. FIG. 3 shows the following steps 300 to 332.

Step 300: User device 100 receives the paging packet 530 (FIG. 4C) from the access point (AP) device 140.

Step 302: The user device's L2CAP layer 220 determines in decision block 304, if the class of device (CoD) field 542 in the paging packet 530 indicates that the next packet is an Access Point Service Indication (APSI) message 550.

Step 320: If it is, then when the user's device 100 receives the next packet(s) from the AP 140, the L2CAP layer 220 loads it into an APSI message buffer 236.

Step 322: The L2CAP layer 220 verifies that packet header 554 indicates an APSI message 550 from the AP 140.

Step 324: Then, the L2CAP layer 220 passes the APSI message 550 directly to the GUI application layer 234. The APSI message 550 contains fields for content, title, bitmap, soft key selection items, location information, service type information, the local/global parameter 557, the handoff address 582, and URL.

Step 326: The GUI layer 234 then loads the content, title, bitmap, soft key selection items, location information, service type information, the local/global parameter 557, the handoff address 582, and URL from the APSI message 550 into the display buffer 244 and other buffers.

Step 328: Then, the user selectively enters an input to the GUI 234 to establish a connection with the AP 140 for a session with the service platform server 180.

Step 330: The user device 100 and the AP 140 then open an SDP and/or a non-SDP channel and they begin a session.

Step 332: The AP 140 registers the user's device 100 with the service platform server 180 and requests service for the user's device 100. Then, the user's device 100 and the service platform server 180 conduct a session via the AP 140. The service platform server 180 can then download the maps, advertising and/or other service offerings to the mobile Bluetooth device 100.

Regions outside the coverage area of the short range wireless access point 140 are covered by regional cellular telephone access points 148, such as cellular telephone base stations. The regions inside the short range wireless access ports are also covered by regional cellular telephone access points 148. In accordance with the invention, if the mobile wireless device 100 detects that it has left the coverage area of the short range wireless access point 140 while in contact with the server 180, it will determine whether the global/local parameter 557 indicates that the service is global which means in other words that the service can be acquired using other carriers/bearers. If the parameter 557 is global, then the mobile wireless device 100 may store a bookmark of the server's URL, for example the URL and path name for one of the prior web pages downloaded from the server 180. The mobile wireless device 100 displays a notice on browser 102 to the user, offering the user the option of continuing the contact with the server 180 over the regional cellular telephone network. If the user selects to continue the contact with the server 180, then a stored handover address 582 is accessed. The handover address 582 may be stored in the mobile wireless device 100 or alternately, it may be stored in the short range wireless access point 140. The stored handover address 582 may be a default address or alternately, it may be a handover address included in the prior response message from the server 180. The handover address 582 will typically be the telephone number of a protocol gateway 118, such as a WAP gateway, connected between the cellular telephone network 116 and the Internet 144. A cellular telephone connection is made by the mobile wireless device 100 with the regional cellular telephone access point 148. Then, a cellular telephone call is placed to the protocol gateway 118. When the call is completed over the telephone network 116 from the mobile wireless device 100 to the protocol gateway 118, the mobile wireless device 100 sends a message to the protocol gateway 118, which it forwards to the server 180. Depending on the request, the server 180 responds by resuming the operations it had previously been conducting in its prior contact with the mobile wireless device 100.

Alternately, if Step 302 determines in decision block 304 that the class of device (CoD) field 542 in the paging packet 530 does not indicate that the next packet is an Access Point Service Indication (APSI) message 550, then the process flows through steps 306 to 318.

Step 306: The user's device 100 opens the service discovery protocol (SDP) channel and begins a session with the access point 140.

Step 308: The user's device 100 opens a non-SDP channel with the access point 140.

Step 310: The user's device 100 waits for registration of the user's device and request for service via the access point 140 from the service platform server 180.

Step 312: The user's device 100 conducts a service session via the access point 140 with the service platform server 180.

Step 314: The user's device 100 receives a service message at the L2CAP layer 220 with content, title, bitmap, soft key selection items, location information, service type information, the local/global parameter 557, the handoff address 582, and URL.

Step 316: The L2CAP layer 220 passes the service message up through all of the layers RFCOMM, PPP, IP, UDP, WAP, and WAE of the protocol stack in the user's device 100, to the GUI application layer 234.

Step 318: The GUI application layer 234 loads the content, title, bitmap, soft key selection items, the local/global parameter 557, the handoff address 582, and URL, from the service message into the display buffer 244 or other buffers. Optionally, location information and service type information can also be loaded into the display buffer 244.

In accordance with the invention, if the mobile wireless device 100 detects that it has left the coverage area of the short range wireless access point 140 while in contact with the server 180, it will determine whether the global/local parameter 557 indicates that the service is global. If the parameter 557 is global, then the mobile wireless device 100 may store a bookmark of the server's URL. The mobile wireless device 100 displays a notice on browser 102 to the user, offering the user the option of continuing the contact with the server 180 over the regional cellular telephone network. If the user selects to continue the contact with the server 180, then a stored handover address 582 is accessed. The handover address 582 will typically be the telephone number of a protocol gateway 118 connected between the cellular telephone network 116 and the Internet 144. A cellular telephone connection is made by the mobile wireless device 100 with the regional cellular telephone access point 148. Then, a cellular telephone call is placed to the protocol gateway 118. When the call is completed over the telephone network 116 from the mobile wireless device 100 to the protocol gateway 118, the mobile wireless device 100 sends a message to the protocol gateway 118, which it forwards to the server 180. Depending on the request, the server 180 responds by resuming the operations it had previously been conducting in its prior contact with the mobile wireless device 100.

In FIG. 3A, a flow diagram of another alternate embodiment of the invention shows the operation of the User's Bluetooth device 100 when receiving an APSI message 550 without any previous warnings. The figure shows the steps 400 to 412.

Step 400: User device 100 sends inquiry response packet 510 (FIG. 4B) and receives the paging packet 530 (FIG. 4C) from the access point (AP) device 140.

Step 402: The user device 100 receives the next packet(s) from the AP, and the L2CAP layer 220 determines that packet header 554 indicates an APSI message 550 from the AP 140 and the L2CAP layer 220 loads it into an APSI message buffer 236.

Step 404: Then, the L2CAP layer 220 passes the APSI message 550 directly to the GUI application layer 234. The APSI message 550 contains fields for content, title, bitmap, soft key selection items, location information, service type information, the local/global parameter 557, the handoff address 582, and URL.

Step 406: The GUI layer 234 then loads the content, title, bitmap, soft key selection items, location information, service type information, the local/global parameter 557, the handoff address 582, and URL from the APSI message 550 into the display buffer 244.

Step 408: Then, the user selectively enters an input to the GUI 234 to establish a connection with the AP 140 for a session with the service platform server 180.

Step 410: The user device 100 and the AP 140 then open an SDP and/or a non-SDP channel and they begin a session.

Step 412: The AP 140 registers the user's device 100 with the service platform server 180 and requests service for the user's device 100. Then, the user's device 100 and the service platform server 180 conduct a session via the AP 140. The service platform server 180 can then download the maps, advertising and/or other service offerings to the mobile Bluetooth device 100.

The following paragraphs discuss the use of the Bluetooth inquiry, inquiry response, and paging packets by the alternate embodiment of the invention. To recap, the Bluetooth access point device 140 is connected over a landline network 142 and 144 or alternatively over wireless network to the service platform server 180. The service platform server 180 has service offerings that it would like to make available to mobile Bluetooth devices 100 passing within the RF communications range of the Bluetooth access point device 140. In accordance with the alternate embodiment of the invention, the Bluetooth access point device 140 stores an Access Point Service Indicator (APSI) message 550 characterizing the offerings of the service platform server 180.

According to one alternate embodiment of the invention, in order to quickly communicate and display the content of the APSI message 550 on the user's device 100, notification of the impending arrival of the APSI message 550 is made by information inserted by the access point 140 into the inquiry response packets or paging packets sent to the user's device 100. According to another alternate embodiment of the invention the recognition of the message can also be accomplished without any previous notification to the terminal.

The Bluetooth access point device 140 periodically sends out Bluetooth inquiry packets 500 via RF link to any mobile Bluetooth devices 100 within the RF communications range.

FIG. 4A shows the Bluetooth packet structure for an inquiry packet 500 sent by a Bluetooth access point device to the user's device 100. The general inquiry access code (GIAC) of the packet 500 is recognized by all Bluetooth devices as an inquiry message. During the inquiry procedure, any other Bluetooth devices that are in the inquiry scan state, such as the user's device 100, are scanning for the receipt of inquiry packets 500. If the user's device 100 in the inquiry scan state receives the inquiry packet 500, it will respond with an inquiry response packet 510 that has sufficient information to enable the Bluetooth access point device to build its inquiry response table of essential information required to make a connection. Any Bluetooth device recognizing inquiry packet 500 can respond. FIG. 4B shows the Bluetooth frequency hop synchronization (FHS) packet structure for an inquiry response packet 510 sent by the user's device 100. The FHS packet structure for an inquiry response packet 510 sent by the user's device 100 includes an access code field 512, a header which includes a slave member number field 514 in which AM_ADDR is no yet assigned and is set to zero, a type field 516 and a parity field 518. Another slave member number field 524 also has AM_ADDR set to zero. Field 522 contains user's class-of-device (CoD) information. The FHS packet structure for an inquiry response packet 510, provides essential information about the user's device 100 that enables the Bluetooth access point device to the make a connection to the user's device: Field 520 contains the user's device BD_ADDR and field 526 contains the user's device current clock value.

The Bluetooth access point device uses the information provided in the inquiry response packet 510 it has received from the user's device to be paged, to prepare and send a paging message to the user's paged device. To establish a connection, the access point paging device must enter the page state. The Bluetooth access point device invokes its link controller to enter the page state, where it will transmit paging messages to the user's paged device using the access code and timing information acquired from the inquiry response packet 510. The user's paged device must be in the page scan state to allow the access point paging device to connect with it. Once in the page scan state, the user's paged device will acknowledge the paging messages and the access point paging device will send a paging packet 530 shown in FIG. 4C, which provides the clock timing and access code of the Bluetooth access point paging device to the user's paged device. The paging packet 530 includes the class of device (CoD) field 542 that is a 24-bit field usually used to specify the class of the paging device, such as "FAX machine".

In accordance with one alternate embodiment of the invention, the class of device (CoD) field 542 of the paging packet 530 sent by the Bluetooth access point paging device includes a unique value indicating that the next packet to be received from the Bluetooth access point paging device is the Access Point Service Indicator (APSI) message.

Figure 4C:
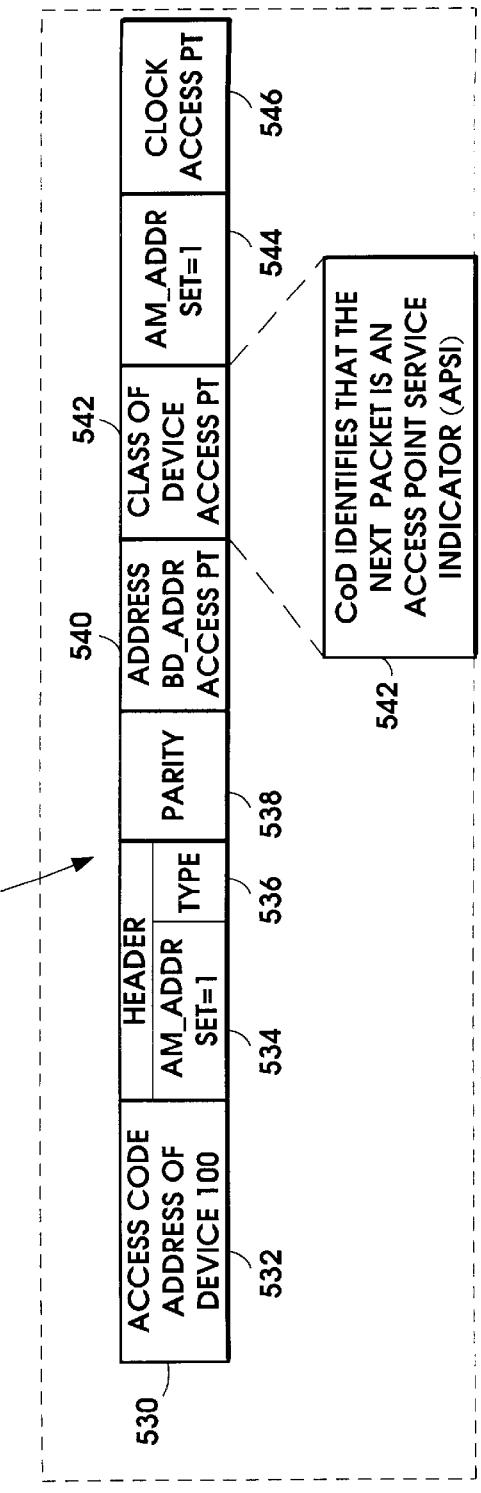
FIG. 4C shows the alternate embodiment of the invention with the Bluetooth frequency hop synchronization (FHS) packet structure for the paging packet 530 sent by the Bluetooth access point device.

Since Bluetooth access point device has initiated the page, it will be the master device in the new piconet being formed by the two devices. The user's paged device, which will become the slave to the Bluetooth access point device, must also know the Bluetooth access point device BD_ADDR, since it is the master device's address that is used in the piconet access code for the new piconet being formed by the two devices. FIG. 4C shows the Bluetooth frequency hop synchronization (FHS) packet structure for a paging packet 530 sent by the Bluetooth access point device. The FHS packet structure for the paging packet 530 sent by the Bluetooth access point device includes an access code field 532 which contains the user's paged device's BD_ADDR, a header which includes a slave member number field 534 in which AM ADDR is now assigned the value of one, a type field 536 and a parity field 538. Another slave member number field 544 also has AM_ADDR set to one. Field 542 contains the Bluetooth access point device class-of-device (CoD) unique value.

According to one alternate embodiment of the invention, the CoD field 542 indicates that the next packet sent to the terminal is an APSI message. If such indication is used, the user's device 100 can be set to a mode where APSI messages are refused and if refusal is preferred, the user's device 100 is automatically set to not reply to paging with APSI indication.

The FHS packet structure for the paging packet 530, provides the essential information about the Bluetooth access point device that enables the user's paged device to the make the connection to the Bluetooth access point device: Field 540 contains the Bluetooth access point device BD_ADDR and field 546 contains the Bluetooth access point device current clock value.

Figure 4D:
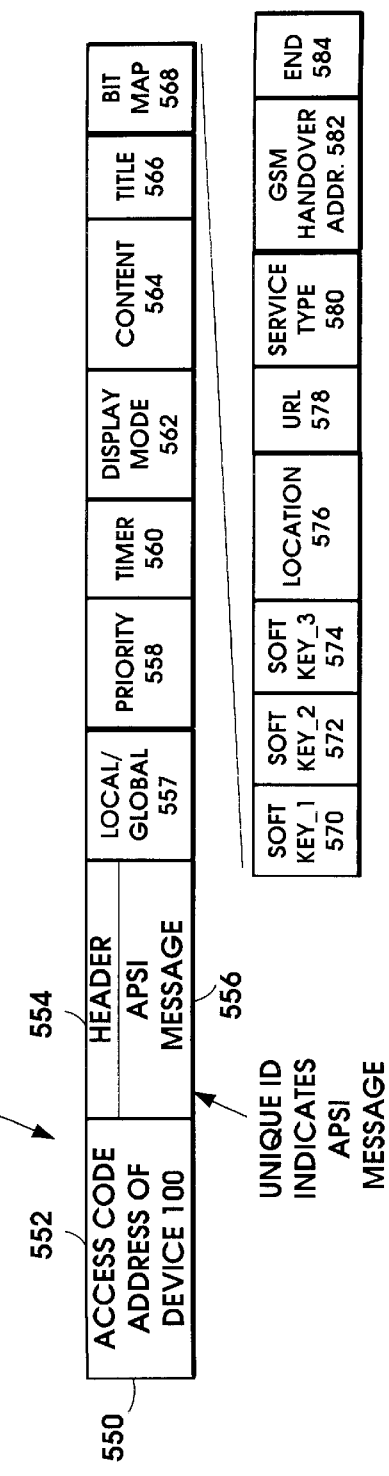
FIG. 4D shows the alternate embodiment of the invention with the Bluetooth packet structure for the subsequent APSI message.

In accordance with the alternate embodiment of the invention, FIG. 4D shows the Bluetooth packet structure for the subsequent APSI message 550. The APSI message includes a header 554 that has the unique message ID 556 that indicates it is an APSI message. The APSI message 550 includes the header 554 which contains the unique APSI message ID 556. Also included in the APSI message 550 in the body portion 238, is the local/global parameter 557, priority information 558, timer information 560, display mode information 562, content 564, a title 566, a bit map 568, soft key selection_1 information 570, soft key selection_2 information 572, soft key selection_3 information 574, location information 576, service type information 578, URL information 580, the handoff address 582, and an end marker 584. Location information includes coordinates and a location name. These parameters can be applied in the GUI of the user's device in an appropriate manner. Local/Global parameters describe whether the service is available locally, i.e., only inside the current Bluetooth coverage area. Global means that the service is available inside the Bluetooth coverage area, but also outside the coverage area. When the service is available also outside the Bluetooth coverage area, the user's device queries whether a default bearer (e.g., WAP over GSM-data) may be activated in order to maintain the connection to the service.

Instead of the access point 140 sending out an inquiry packet 500 and receiving an inquiry response packet 510 from user's device 100 with the user device's address 520 and class of device 522 information, the user's device 100, itself, can initiate the connection. The user's device 100 can send out an inquiry packet 500 shown in FIG. 4A. The access point 140 will respond with an inquiry response packet, modified from that shown for packet 510 in FIG. 4B, by having the sender's address field 520 contain the access point's address and by having the sender's class of device field 522 contain the unique CoD value. According to one alternate embodiment of the invention the unique CoD value identifies that the next packet to be sent by the access point 140 is the APSI message 550. The access point 140 will then have to wait until the user's device 100 responds with a page packet similar to packet 530 of FIG. 4C, since the access point 140 will need the address in the sender's address field 540 of the page packet in order to use it as the destination address 552 in the APSI message 550. The user device's paging packet 530, will contain the user device's address in field 540 and class of device information in field 542, which is the information needed by the access point 140 to select and return an appropriate APSI message 550. The user device's paging packet 530 received by the access point 140, will be buffered in the receive packet buffer 252 of FIG. 2A. There, its sender's address field 540 of FIG. 4C can be matched with address value 266 in the trigger word table 260 of FIG. 2A. For example, the address of the device 100 in field 540 can be matched with address values 266 in the trigger word table 260. Also, the class of device of the device 100 in field 542 can be compared with class of device values 268 stored in the trigger word table 260. If there is a match, then the APSI message cache 285 is checked by means of the APSI cache hit logic 283, to determine if a corresponding APSI message 550 is stored in the cache 285. If there is a corresponding APSI message in the cache 285, then the APSI message 550 is immediately sent to the mobile Bluetooth device 100.

Figure 5:
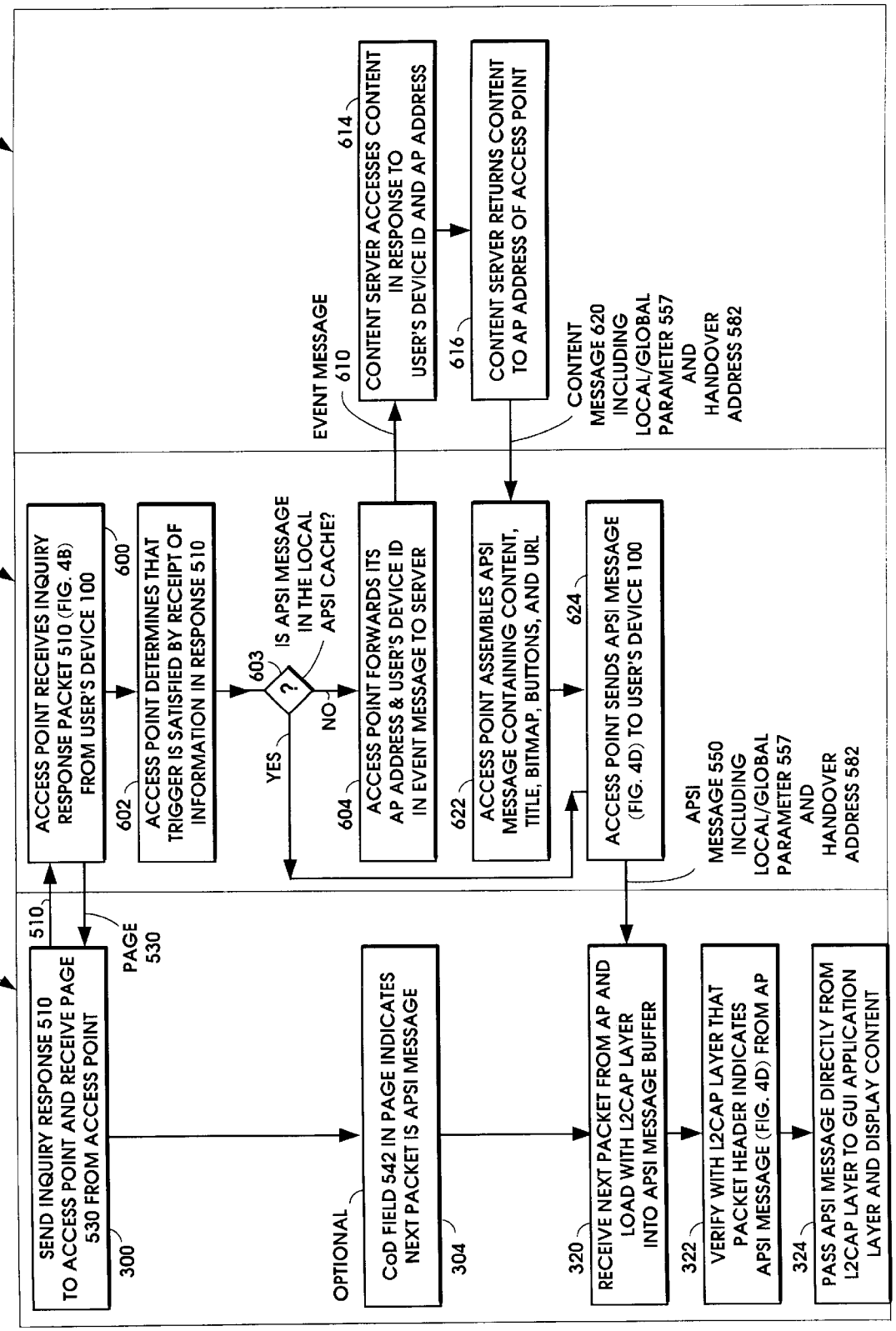
FIG. 5 is a network process diagram of the alternate embodiment of the invention, showing the interaction between the user's device 100, the access point 140, and the content server 180.

FIG. 5 is a network process diagram of an alternate embodiment of the invention, showing the interaction between the user's device 100, the access point 140, and the content server 180. The network process diagram is divided into three columns with the user's device 100 on the left column, the access point device 140 in the middle column, and the content server 180 in the right hand column. The network process begins with step 300 in the user's device 100 sending an inquiry response 510 to the access point 140 and receiving a page 530 from the access point. The corresponding step at the access point 140 is step 600 where the access point receives the inquiry response packet 510 (which is shown in FIG. 4B) from the user's device 100. Remaining at the access point device 140 in FIG. 5, step 600 flows to step 602 wherein the access point determines that a trigger word is satisfied in its trigger table 260 by the receipt of information in the inquiry response 510. Then step 602 passes to the decision block 603, which determines whether a corresponding APSI message 550 is currently stored in the local APSI cache 285. If it is, then the decision block 603 passes to step 624 where the access point 140 sends the APSI message 550 shown in FIG. 4D to the user's device 100. Alternately, if the decision block 603 determines that the corresponding APSI message 550 is not stored in the local APSI cache 285, then block 603 flows to step 604. In step 604, the access point 140 forwards its access point address 290 and the user's device ID 284 in an event message 610 of FIG. 2B to the content server 180. Turning now to the content server 180 of FIG. 5, step 614 receives the event message 610 and the content server 180 accesses content in its database 182 in response to the user's device ID 284 and the access point address 290. Step 614 then flows to step 616 in the content server 180, where the content server returns the content information in a content message 620 of FIG. 2C to the access point 140 as specified in the access point address 290 provided in the event message 610. The content message 620 includes the local/global parameter 557 and the handoff address 582. Returning to the access point 140 in FIG. 5, step 622 receives the content message 620 and uses it to assemble the APSI message 550 so as to contain the content 564, a title 566, a bit map 568, soft key_1 selection information 570, soft key_2 selection information 572, soft key_3 selection information 574, location information 576, URL information 578, service type information 580 the local/global parameter 557 and the handoff address 582 contained in the content message 620 of FIG. 2C. Then step 622 flows to step 624, wherein the access point 140 sends the newly assembled APSI message 550 to the user's device 100. Turning now to the user's device 100 of FIG. 5, step 304 is optional and depending on the embodiment of the invention. Step 320 receives the APSI message 550 and stores it in the APSI message buffer 236. Then in step 322, the user's device 100 verifies with the L2CAP layer 220 that the packet header 554 of the received packet indicates that it is in fact an APSI message 550 as shown in FIG. 4D. Then step 322 flows to step 324 where the L2CAP layer 220 immediately passes the APSI message 550 over path 242 to the GUI application layer 234, thereby bypassing the middleware protocol group 224 layers. The content 564, a title 566, a bit map 568, soft key_1 selection information 570, soft key_2 selection information 572, soft key_3 selection information 574, location information 576, URL information 578, service type information 580, the local/global parameter 557 and the handoff address 582 are then processed by the application group 235 programs and the content 564 is displayed to the user in the browser 102.

Note that decision block 603 of FIG. 5 enables the access point to pass directly to step 624 to send the APSI message(s) stored in its memory directly to all mobile devices entering its coverage area, without fetching content for APSI messages from the server.

The resulting invention solves the problem of enabling a mobile wireless device to resume an Internet contact with a web site, which was being conducted through a short range wireless access point, but which has been interrupted by moving the mobile device out of the coverage area of the access point.

Although a specific embodiment of the invention has been disclosed, it will be understood by those having skill in the art that changes can be made to that specific embodiment without departing from the spirit and the scope of the invention.

What is claimed is:

1. A method in a short range wireless access point for enabling a mobile wireless device to resume an Internet service with a network server, the service having been interrupted by moving the mobile device out of the coverage area of the access point, comprising:

forwarding at the short range wireless access point, a request from the mobile wireless device to the network server, the request being for service to be obtained over the Internet from the server, the forwarding occurring during a period when the mobile device is within coverage area of the access point;

forwarding at the access point, a response message from the server to the mobile device, the response message including a global/local parameter that will notify the mobile device whether the requested service is available outside the coverage area of the access point; and sending from the short range wireless access point to the mobile device, a handover telephone address of a gateway connected between a cellular telephone network and the Internet, thereby enabling a connection to be made by the mobile device via a regional cellular telephone access point to the gateway, to resume the Internet service.

2. The method of claim 1, which further comprises:

including the handover telephone address in the response message from the server.

3. The method of claim 1, which further comprises:

forwarding at the regional cellular telephone access point, a bookmark URL from the mobile wireless device to the network server, thereby enabling a connection to the server to be completed by the gateway, to resume the Internet service.

4. The method of claim 1, which further comprises:

said short-range wireless access point being a Bluetooth access point.

5. The method of claim 1, which further comprises:

said short-range wireless access point being an IrDA Infrared Data Protocol access point.

6. The method of claim 1, which further comprises:

said short-range wireless access point being an IEEE 802.11 wireless LAN access point.

7. The method of claim 1, which further comprises:

said short-range wireless access point being a HiperLAN access point.

8. The method of claim 1, which further comprises:

said mobile wireless device being equipped with both short-range wireless communications circuits and with cellular telephone communications circuits.

9. The method of claim 1, which further comprises:

said mobile wireless device being a Bluetooth-equipped cellular telephone.

10. The method of claim 1, which further comprises:

said regional cellular telephone access point being a GSM base station.

11. The method of claim 1, which further comprises:

said regional cellular telephone access point being a GPRS base station.

12. The method of claim 1, which further comprises:

said regional cellular telephone access point being a UMTS base station.

13. The method of claim 1, which further comprises:

said regional cellular telephone access point being a EDGE base station.

14. The method of claim 1, which further comprises:

said gateway being a wireless application protocol gateway.

15. A method in a mobile wireless device to resume an Internet service with a network server, the service having been interrupted by moving the mobile device out of a coverage area of a short range wireless access point, comprising:

sending a request to the short range wireless access point, for service to be obtained over the Internet from the network server, the sending occurring during a period when the mobile device is within the coverage area of the access point;

receiving from the short range access point, a response message from the server, including a global/local parameter that indicates whether the requested service is available outside the coverage area of the access point;

detecting that the mobile device has left the coverage area of the short-range wireless access point;

determining whether the global/local parameter indicates that the service is global;

displaying an option to the user for continuing the service with the server over a regional cellular telephone network;

receiving a user selection to continue the service with the server;

accessing a stored handover address of a protocol gateway connected between a cellular telephone network and the Internet;

establishing a wireless connection between the mobile wireless device and a regional cellular telephone access point;

placing a cellular telephone call via the regional cellular telephone access point to the protocol gateway using the handover address; and sending a telephone message to the protocol gateway for forwarding an Internet message to the network server to resume service between the mobile device and the server.

16. The method of claim 15, which further comprises:

receiving from the short-range wireless access point, the handover address of the gateway, thereby enabling a connection to be made by the mobile device via the regional cellular telephone access point to the gateway, to resume the Internet service.

17. The method of claim 16, which further comprises:

including the handover address in the response message from the server.

18. The method of claim 16, which further comprises:

sending a bookmark URL to the gateway via the regional cellular telephone access point, for forwarding to the network server, thereby enabling a connection to the server be completed by the gateway, to resume the Internet service.

19. The method of claim 16, which further comprises:

said regional cellular telephone access point being a GSM base station.

20. The method of claim 16, which further comprises:

said regional cellular telephone access point being a GPRS base station.

21. The method of claim 16, which further comprises:
said regional cellular telephone access point being a UMTS base station.

22. The method of claim 16, which further comprises:
said regional cellular telephone access point being a EDGE base station.

23. The method of claim 16, which further comprises:
said gateway being a wireless application protocol gateway.

24. The method of claim 15, which further comprises:
said short-range wireless access point being a Bluetooth access point.

25. The method of claim 15, which further comprises:
said short-range wireless access point being an IrDA Infrared Data Protocol access point.

26. The method of claim 15, which further comprises:
said short-range wireless access point being an IEEE 802.11 wireless LAN access point.

27. The method of claim 15, which further comprises:
said short-range wireless access point being a HiperLAN access point.

28. The method of claim 15, which further comprises:
said mobile wireless device being equipped with both short-range wireless communications circuits and with cellular telephone communications circuits.

29. The method of claim 15, which further comprises:
said mobile wireless device being an Bluetooth-equipped cellular telephone.

30. A computer program product to enable a mobile wireless device to resume an Internet service with a network server, the service having been interrupted by moving the mobile device out of a coverage area of a short range wireless access point, comprising:
a computer readable medium;
program code in said computer readable medium for sending a request to the short range wireless access point, for service to be obtained over the Internet from the network server, the sending occurring during a period when the mobile device is within the coverage area of the access point;
program code in said computer readable medium for receiving from the short range access point, a response message from the server, including a global/local parameter that indicates whether the requested service is available outside the coverage area of the access point;
program code in said computer readable medium for detecting that the mobile device has left the coverage area of the short range wireless access point;
program code in said computer readable medium for determining whether the global/local parameter indicates that the service is global;
program code in said computer readable medium for displaying an option to the user for continuing the service with the server over a regional cellular telephone network;
program code in said computer readable medium for receiving a user selection to continue the service with the server;
program code in said computer readable medium for accessing a stored handover address of a protocol gateway connected between a cellular telephone network and the Internet;
program code in said computer readable medium for establishing a wireless connection between the mobile wireless device and a regional cellular telephone access point;
program code in said computer readable medium for placing a cellular telephone call via the regional cellular telephone access point to the protocol gateway using the handover address; and
program code in said computer readable medium for sending a telephone message to the protocol gateway for forwarding an Internet message to the network server to resume/service between the mobile device and the server.

31. A computer program product of claim 30, which further comprises:
program code in said computer readable medium for receiving from the short range wireless access point, the handover address of the gateway, thereby enabling a connection to be made by the mobile device via the regional cellular telephone access point to the gateway, to resume the Internet service.

32. A computer program product of claim 31, which further comprises:
said handover address being included in the response message from the server.

33. A computer program product of claim 31, which further comprises:
program code in said computer readable medium for sending a bookmark URL to the gateway via the regional cellular telephone access point, for forwarding to the network server, thereby enabling a connection to the server be completed by the gateway, to resume the Internet service.

34. A computer program product of claim 30, which further comprises:
said short range wireless access point being a Bluetooth access point.

35. A short range wireless access point for enabling a mobile wireless device to resume a service with a network server, the service having been interrupted by moving the mobile device out of the coverage area of the access point, comprising:
a short range wireless transceiver for receiving a request from the mobile wireless device;
a processor coupled to the transceiver, for forwarding the request from the mobile wireless device over a network to a network server, the request being for service to be obtained from the server, the forwarding occurring during a period when the mobile device is within coverage area of the access point;
a network interface coupled to the network, for receiving from the server, a response message including a global/local parameter indicating whether the requested service is available outside the coverage area of the access point wherein said transceiver forwards the response message to the mobile device; and
sending to the mobile device, a handover telephone address of a gateway connected between a cellular telephone network and the network server, thereby enabling a connection to be made by the mobile device via a regional cellular telephone access point to the gateway, to resume service with the server.

36. The short range wireless access point of claim 35, which further comprises:
said response message including the handover telephone address.

37. The short range wireless access point of claim 35, which further comprises:
said short range wireless access point being a Bluetooth access point.

38. The short range wireless access point of claim 35, which further comprises:
said short range wireless access point being an IrDA Infrared Data Protocol access point.

39. The short range wireless access point of claim 35, which further comprises:
said short range wireless access point being an IEEE 802.11 wireless LAN access point.

40. The short range wireless access point of claim 35, which further comprises:
said short range wireless access point being a HiperLAN access point.

41. The short range wireless access point of claim 35, which further comprises:
said mobile wireless device being equipped with both short range wireless communications circuits and with cellular telephone communications circuits.

42. The short range wireless access point of claim 35, which further comprises:
said mobile wireless device being a Bluetooth-equipped cellular telephone.

43. The short range wireless access point of claim 35, which further comprises:
said regional cellular telephone access point being a GSM base station.

44. The short range wireless access point of claim 35, which further comprises:
said regional cellular telephone access point being a GPRS base station.

45. The short range wireless access point of claim 35, which further comprises:
said regional cellular telephone access point being a UMTS base station.

46. The short range wireless access point of claim 35, which further comprises:
said regional cellular telephone access point being an EDGE base station.

47. The short range wireless access point of claim 35, which further comprises:
said gateway being a wireless application protocol gateway.

48. A mobile wireless device to resume a service with a network server, the service having been interrupted by moving the mobile device out of a coverage area of a short range wireless access point, comprising:
a short range wireless transceiver for sending a request to a short range wireless access point, for service to be obtained over a network from a network server, the sending occurring during a period when the mobile device is within the coverage area of a short range wireless access point;
said transceiver receiving from the short range wireless access point, a response message from the server, including a global/local parameter that indicates whether the requested service is available outside the coverage area of the short range wireless access point;
a processor coupled to the short range wireless transceiver, for detecting that the mobile device has left the coverage area of the short range wireless access point;
said processor determining whether the global/local parameter indicates that the service is global;
a user interface coupled to the processor, for displaying an option to the user for continuing the service with the server over a regional cellular telephone network;
said user interface receiving a user selection to continue the service with the server;
said processor accessing a stored handover address of a protocol gateway connected between a cellular telephone network and the Internet;
a cellular telephone transceiver coupled to the processor, for establishing a wireless connection between the mobile wireless device and a regional cellular telephone access point;
said cellular telephone transceiver placing a cellular telephone call via the regional cellular telephone access point to the protocol gateway using the handover address; and
said processor sending a telephone message to the protocol gateway for forwarding a message to the network server to resume service between the mobile device and the server.

49. The mobile wireless device of claim 48, which further comprises:
said short range wireless transceiver receiving from the short range wireless access point, the handover address of the gateway, thereby enabling a connection to be made by the mobile device via the regional cellular telephone access point to the gateway, to resume the server service.

50. The mobile wireless device of claim 49, which further comprises:
said response message including the handover address.

51. The mobile wireless device of claim 49, which further comprises:
said processor sending a bookmark URL to the gateway via the regional cellular telephone access point, for forwarding to the network server, thereby enabling a connection to the server be completed by the gateway, to resume the server service.

52. The mobile wireless device of claim 49, which further comprises:
said regional cellular telephone access point being a GSM base station.

53. The mobile wireless device of claim 49, which further comprises:
said regional cellular telephone access point being a GPRS base station.

54. The mobile wireless device of claim 49, which further comprises:
said regional cellular telephone access point being a UMTS base station.

55. The mobile wireless device of claim 49, which further comprises:
said regional cellular telephone access point being a EDGE base station.

56. The mobile wireless device of claim 48, which further comprises:
said mobile wireless device being equipped with both short range wireless communications circuits and with cellular telephone communications circuits.

57. The mobile wireless device of claim 48, which further comprises:
said mobile wireless device being a Bluetooth-equipped cellular telephone.

58. A method in a short range wireless access point for enabling a mobile wireless device to resume a network service with a network server, the service having been interrupted by moving the mobile device out of the coverage area of the access point, comprising:
forwarding at the short range wireless access point, information from the mobile wireless device to the network server, the information being associated with service available over the network from the server, the forwarding occurring during a period when the mobile device is within coverage area of the access point;
forwarding at the access point, an APSI message with information from the server to the mobile device, the APSI message including a global/local parameter that will notify the mobile device whether the service is available outside the coverage area of the access point; and sending from the short range wireless access point to the mobile device, a handover telephone address of a gateway connected between a cellular telephone network and the network, thereby enabling a connection to be made by the mobile device via a regional cellular telephone access point to the gateway, to resume the network service.

59. The method of claim 58, which further comprises:
including the handover telephone address in the APSI message.

60. The method of claim 58, which further comprises:
said short range wireless access point being a Bluetooth access point.

61. The method of claim 58, which further comprises:
said short range wireless access point being an IrDA Infrared Data Protocol access point.

62. The method of claim 58, which further comprises:
said short range wireless access point being an IEEE 802.11 wireless LAN access point.

63. The method of claim 58, which further comprises:
said short range wireless access point being a HiperLAN access point.

64. A method in a mobile wireless device to resume service with a network server, the service having been interrupted by moving the mobile device out of a coverage area of a short range wireless access point, comprising:

sending information to the short range wireless access point during a period when the mobile device is within the coverage area of the access point;

receiving from the short range access point, an APSI message with information from the network server, including a global/local parameter that indicates whether service is available outside the coverage area of the access point;

detecting that the mobile device has left the coverage area of the short range wireless access point;

determining whether the global/local parameter indicates that the service is global;

displaying an option to the user for continuing the service with the server over a regional cellular telephone network;

receiving a user selection to continue the service with the server;

accessing a stored handover address of a protocol gateway connected between a cellular telephone network and the network;

establishing a wireless connection between the mobile wireless device and a regional cellular telephone access point;

placing a cellular telephone call via the regional cellular telephone access point to the protocol gateway using the handover address; and sending a telephone message to the protocol gateway for forwarding a message to the network server to resume service between the mobile device and the server.

65. The method of claim 64, which further comprises:
receiving from the short range wireless access point, the handover address of the gateway, thereby enabling a connection to be made by the mobile device via the regional cellular telephone access point to the gateway, to resume the network service.

66. The method of claim 65, which further comprises:
including the handover address in the APSI message.

67. The method of claim 65, which further comprises:
sending a bookmark URL to the gateway via the regional cellular telephone access point, for forwarding to the network server, thereby enabling a connection to the server be completed by the gateway, to resume the network service.

68. The method of claim 65, which further comprises:
said regional cellular telephone access point being a GSM base station.

69. The method of claim 65, which further comprises:
said regional cellular telephone access point being a GPRS base station.

70. The method of claim 65, which further comprises:
said regional cellular telephone access point being a UMTS base station.

71. The method of claim 65, which further comprises:
said regional cellular telephone access point being a EDGE base station.

72. The method of claim 65, which further comprises:
said gateway being a wireless application protocol gateway.

73. The method of claim 64, which further comprises:
said short range wireless access point being a Bluetooth access point.

74. The method of claim 64, which further comprises:
said short range wireless access point being an IrDA Infrared Data Protocol access point.

75. The method of claim 64, which further comprises:
said short range wireless access point being an IEEE 802.11 wireless LAN access point.

76. The method of claim 64, which further comprises:
said short range wireless access point being a HiperLAN access point.

77. The method of claim 64, which further comprises:
said mobile wireless device being equipped with both short range wireless communications circuits and with cellular telephone communications circuits.

78. The method of claim 64, which further comprises:
said mobile wireless device being a Bluetooth-equipped cellular telephone.

79. A method for local service handover, comprising:
forwarding at a short range wireless access point operating according to its specification, a request from a mobile wireless device to the network server, the request being for service to be obtained over the Internet from the server, the forwarding occurring during a period when the mobile device is within coverage area of the access point;

forwarding at the access point, a response message from the server to the mobile device, the response message including a global/local parameter that will notify the mobile device whether the requested service is available outside the coverage area of the access point;

sending the mobile device a handover address of a gateway for roaming purposes; and enabling the mobile device to continue the requested service with the network server in a cellular telephone network operating according to cellular network specifications, the service having been interrupted by moving the mobile device out of the coverage area of the access point.

80. The method of claim 79 comprising:
moving the mobile device from the coverage area of the access point into a cellular network area via the handover address of the gateway.

81. The method of claim 80 wherein continuing the requested service with the network server is at the option of a user of the mobile device.

* * * * *

UNITED STATES PATENT AND TRADEMARK OFFICE

CERTIFICATE OF CORRECTION

PATENT NO. : 6,744,753 B2
DATED : June 1, 2004
INVENTOR(S) : Heinonen et al.

It is certified that error appears in the above-identified patent and that said Letters Patent is hereby corrected as shown below:

Title page,
Item [56], References Cited, U.S. PATENT DOCUMENTS, please insert the following:

| | | |
|---|---|---|
| -- 2002/0198882 | 12/26/02 | Linden et al. |
| 2002/0052873 | 05/02/02 | Delgado et al. |
| 2002/0019882 | 02/14/02 | Soejima et al. |
| 5,606,617 | 02/25/97 | Brands |
| 5,668,878 | 09/16/97 | Brands |
| 5,696,827 | 12/09/97 | Brands |
| 5,749,081 | 05/05/98 | Whiteis |
| 6,006,200 | 12/21/99 | Boies et al. |
| 6,023,241 | 02/08/00 | Clapper |
| 6,041,311 | 03/21/00 | Chislenko et al. |
| 6,049,777 | 04/11/00 | Sheena et al. |
| 6,052,467 | 04/18/00 | Brands |
| 6,064,980 | 05/16/00 | Jacobi et al. |
| 6,065,012 | 05/16/00 | Balsara et al. |
| 6,092,049 | 07/18/00 | Chislenko et al. |
| 6,108,493 | 08/22/00 | Miller et al. |
| 6,119,101 | 09/12/00 | Peckover |
| 6,138,158 | 12/24/00 | Boyle et al. |
| 6,182,050 | 01/30/01 | Ballard |
| 6,195,651 | 02/27/01 | Handel et al. |
| 6,195,657 | 02/27/01 | Rucker et al. |
| 6,199,099 | 03/06/01 | Gershman et al. |
| 6,205,472 | 03/20/01 | Gilmour |
| 6,236,768 | 05/22/01 | Rhodes et al. |
| 6,253,202 | 06/26/01 | Gilmour |
| 6,253,203 | 06/26/01 | O'Flaherty et al. -- |

UNITED STATES PATENT AND TRADEMARK OFFICE
CERTIFICATE OF CORRECTION

PATENT NO. : 6,744,753 B2
DATED : June 1, 2004
INVENTOR(S) : Heinonen et al.

It is certified that error appears in the above-identified patent and that said Letters Patent is hereby corrected as shown below:

Title page (cont'd),

| | | |
|---|---|---|
| 6,263,447 | 07/17/01 | French et al. |
| 6,275,824 | 08/14/01 | O'Flaherty et al. |
| 6,321,257 | 11/20/01 | Kotola et al. |
| 6,438,585 | 08/20/02 | Mousseau et al. |
| 6,493,550 | 12/10/02 | Raith |
| 6,510,381 | 01/21/03 | Grounds et al. |
| *6,515,974 | 02/2003 | Inoue et al. |
| *6,539,225 | 03/2003 | Lee |
| 6,542,740 | 04/01/03 | Olgaard et al. |
| *6,580,698 | 06/2003 | Nitta |

Item [56], References Cited, FOREIGN PATENT DOCUMENTS,

| | | |
|---|---|---|
| WO 99/66428 | 12/23/99 | WIPO |
| WO 01/50299 | 07/12/01 | WIPO |
| WO 01/46826 | 06/28/01 | WIPO |
| WO 01/35269 | 05/17/01 | WIPO |
| WO 01/35253 | 05/17/01 | WIPO -- |

OTHER PUBLICATIONS, please add:

-- Bisdikian, et al. "Quests in a thetherless world", Wireless Communications and Mobile Computing, 2002, Wiley & Sons, Ltd., pgs. 449-464.
Peddemors et al., "Combining presence, location and instant messaging in a context-aware mobile application framework", Telematica Instituut, 03/20/02, pgs. 3-13.

UNITED STATES PATENT AND TRADEMARK OFFICE
CERTIFICATE OF CORRECTION

PATENT NO. : 6,744,753 B2
DATED : June 1, 2004
INVENTOR(S) : Heinonen et al.

It is certified that error appears in the above-identified patent and that said Letters Patent is hereby corrected as shown below:

Title page (cont'd), http://www.symbian.com/developer/techlib/v70docs/SDL, "How to inquire about services on a remote device", 12/31/03, 1 pg. --

Signed and Sealed this

Fourteenth Day of December, 2004

JON W. DUDAS
*Director of the United States Patent and Trademark Office*